(12) United States Patent
Awoniyi-Oteri et al.

(10) Patent No.: US 12,167,408 B2
(45) Date of Patent: Dec. 10, 2024

(54) CONFIGURED GRANT OR SEMI-PERSISTENT SCHEDULING FOR DORMANT SECONDARY CELL GROUP

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Sony Akkarakaran, Poway, CA (US); Junyi Li, Fairless Hills, PA (US); Punyaslok Purkayastha, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 17/443,139

(22) Filed: Jul. 21, 2021

(65) Prior Publication Data

US 2022/0070915 A1    Mar. 3, 2022

Related U.S. Application Data

(60) Provisional application No. 63/072,687, filed on Aug. 31, 2020.

(51) Int. Cl.
*H04W 72/23*      (2023.01)
*H04L 1/18*       (2023.01)
(Continued)

(52) U.S. Cl.
CPC ............ *H04W 72/23* (2023.01); *H04L 1/18* (2013.01); *H04W 52/0206* (2013.01); *H04W 72/20* (2023.01); *H04W 76/28* (2018.02)

(58) Field of Classification Search
CPC ..... H04W 76/20; H04W 76/27; H04W 76/28; H04W 76/15; H04W 76/16; H04W 72/20;
(Continued)

(56) References Cited

U.S. PATENT DOCUMENTS

2021/0050987 A1*  2/2021  Hsieh .................... H04W 72/23
2022/0116874 A1*  4/2022  Xu ....................... H04W 52/0235
(Continued)

FOREIGN PATENT DOCUMENTS

CN       113395789 A   *  9/2021
EP         3598806 A1      1/2020
WO    WO-2022019821 A1  *  1/2022

OTHER PUBLICATIONS

Machine-translated document of Han (CN-113395789-A) (Year: 2021).*

(Continued)

*Primary Examiner* — Peter Chen
(74) *Attorney, Agent, or Firm* — Harrity & Harrity, LLP

(57) ABSTRACT

Various aspects of the present disclosure generally relate to wireless communication. In some aspects, a user equipment (UE) may receive an indication that a secondary cell group (SCG) is to enter an SCG dormant state and an indication for using one or more of configured grant (CG) on an uplink or semi-persistent scheduling (SPS) on a downlink for communication with a secondary node (SN) of the SCG during the SCG dormant state. The UE may communicate with the SN of the SCG during the SCG dormant state using the one or more of CG or SPS. Numerous other aspects are provided.

30 Claims, 16 Drawing Sheets

(51) Int. Cl.
*H04W 52/02* (2009.01)
*H04W 72/20* (2023.01)
*H04W 76/28* (2018.01)

(58) Field of Classification Search
CPC ... H04W 72/21; H04W 72/23; H04W 72/231; H04W 72/232; H04W 52/0206; H04L 1/18; H04L 5/001; H04L 5/0092; H04L 5/0094; H04L 5/0096; H04L 5/0098; H04L 5/0048; H04L 5/005; H04L 5/0051; H04L 5/0053
See application file for complete search history.

(56) References Cited

U.S. PATENT DOCUMENTS

| 2022/0264466 A1* | 8/2022 | Al | H04W 76/27 |
| 2022/0279620 A1* | 9/2022 | Rugeland | H04W 72/20 |

OTHER PUBLICATIONS

CATT: "Draft Reply LS on Dormant BWP Configuration and Related Operation", 3GPP Draft, 3GPP TSG-RAN WG1 Meeting #100bis-e, R1-2002057, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 30, 2020, Apr. 11, 2020 (Apr. 11, 2020), XP051875414, 6 Pages, Retrieved from the Internet: URL: https://ftp.3gpp.org/tsg_ran/WG1_RL1/TSGR1_100b_e/Docs/R1-2002057.zip. R1-2002057 Draft reply LS on Dormant BWP Configuration and Related Operation.docx [Retrieved on Apr. 11, 2020] The Whole Document.
International Search Report and Written Opinion—PCT/US2021/070927—ISA/EPO—Nov. 8, 2021.

* cited by examiner

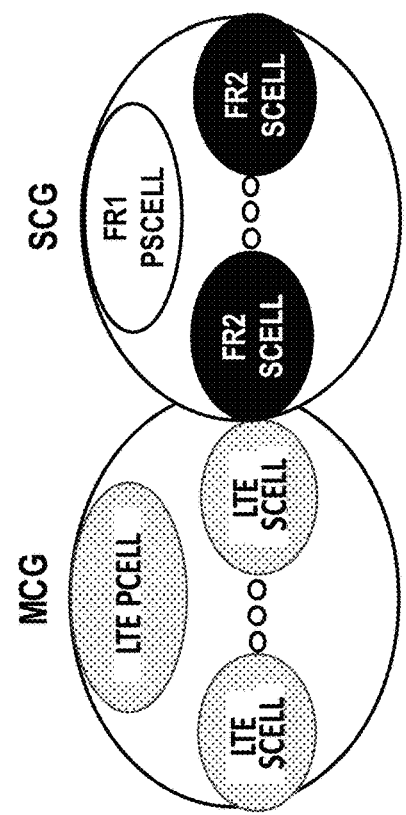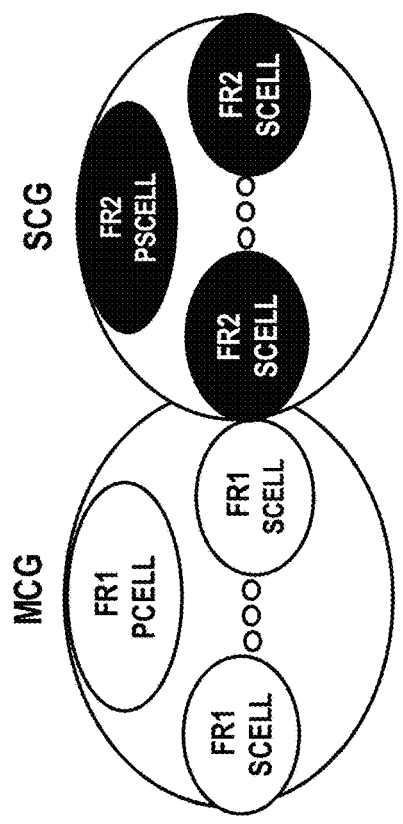
FIG. 5

CONFIGURED GRANT OR SEMI-PERSISTENT SCHEDULING FOR DORMANT SECONDARY CELL GROUP

CROSS-REFERENCE TO RELATED APPLICATION

This patent application claims priority to U.S. Provisional Application No. 63/072,687 filed on Aug. 31, 2020, entitled "CONFIGURED GRANT AND SEMI-PERSISTENT SCHEDULING FOR DORMANT SECONDARY CELL GROUP," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configured grant and/or semi-persistent scheduling for a dormant secondary cell group.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes receiving an indication that a secondary cell group (SCG) is to enter an SCG dormant state and an indication for using one or more of configured grant (CG) or semi-persistent scheduling (SPS) for communication with a secondary node (SN) of the SCG during the SCG dormant state, and communicating with the SN of the SCG during the SCG dormant state using the one or more of CG or SPS.

In some aspects, a method of wireless communication performed by a base station of a master cell group includes transmitting an indication to an SN in an SCG that the SCG is to enter an SCG dormant state and an indication to use one or more of CG or SPS for communication in the SCG during the SCG dormant state, and transmitting, to a UE, the indication to enter the SCG dormant state and the indication to use one or more of CG or SPS for communication in the SCG during the SCG dormant state based at least in part on receiving an acknowledgement of the indication to enter the SCG dormant state from the SN of the SCG.

In some aspects, a method of wireless communication performed by a base station of an SCG includes receiving an indication that the SCG is to enter an SCG dormant state and an indication for using one or more of CG or SPS for communication with a UE during the SCG dormant state, and communicating with the UE during the SCG dormant state using the one or more of CG or SPS.

In some aspects, a UE for wireless communication includes a memory and one or more processors coupled to the memory, the one or more processors configured to receive an indication that an SCG is to enter an SCG dormant state and an indication for using one or more of CG or SPS for communication with an SN of the SCG during the SCG dormant state. The one or more processors are configured to communicate with the SN of the SCG during the SCG dormant state using the one or more of CG or SPS.

In some aspects, a base station of a master cell group for wireless communication includes a memory and one or more processors coupled to the memory, the one or more processors configured to transmit an indication to a base station in an SCG that the SCG is to enter an SCG dormant state and an indication to use one or more of CG or SPS for communication in the SCG during the SCG dormant state. The one or more processors are configured to transmit, to a UE, the indication to enter the SCG dormant state and the indication to use one or more of CG or SPS for communication in the SCG during the SCG dormant state based at least in part on receiving an acknowledgement of the indication to enter the SCG dormant state from the SN of the SCG.

In some aspects, a base station of an SCG for wireless communication includes a memory and one or more processors coupled to the memory, the one or more processors configured to receive an indication that the SCG is to enter an SCG dormant state and an indication for using one or more of CG or SPS for communication with a UE during the SCG dormant state. The one or more processors are configured to communicate with the UE during the SCG dormant state using the one or more of CG or SPS.

In some aspects, a non-transitory computer-readable medium storing a set of instructions for wireless communication includes one or more instructions that, when executed by one or more processors of a UE, cause the UE to receive an indication that an SCG is to enter an SCG dormant state and an indication for using one or more of CG or SPS for communication with an SN of the SCG during the SCG dormant state, and communicate with the SN of the SCG during the SCG dormant state using the one or more of CG or SPS.

In some aspects, a non-transitory computer-readable medium storing a set of instructions for wireless communication includes one or more instructions that, when executed by one or more processors of a base station of a master cell group, cause the base station to transmit an indication to an SN in an SCG that the SCG is to enter an SCG dormant state and an indication to use one or more of CG or SPS for communication in the SCG during the SCG dormant state, and transmit, to a UE, the indication to enter the SCG dormant state and the indication to use one or more of CG or SPS for communication in the SCG during the SCG dormant state based at least in part on receiving an acknowledgement of the indication to enter the SCG dormant state from the SN of the SCG.

In some aspects, a non-transitory computer-readable medium storing a set of instructions for wireless communication includes one or more instructions that, when executed by one or more processors of a base station of an SCG, cause the base station to receive an indication that the SCG is to enter an SCG dormant state and an indication for using one or more of CG or SPS for communication with a UE during the SCG dormant state, and communicate with the UE during the SCG dormant state using the one or more of CG or SPS.

In some aspects, an apparatus for wireless communication includes means for receiving an indication that an SCG is to enter an SCG dormant state and an indication for using one or more of CG or SPS for communication with an SN of the SCG during the SCG dormant state, and means for communicating with the SN of the SCG during the SCG dormant state using the one or more of CG or SPS.

In some aspects, an apparatus for wireless communication includes means for transmitting an indication to an SN in an SCG that the SCG is to enter an SCG dormant state and an indication to use one or more of CG or SPS for communication in the SCG during the SCG dormant state, and means for transmitting, to a UE, the indication to enter the SCG dormant state and the indication to use one or more of CG or SPS for communication in the SCG during the SCG dormant state based at least in part on receiving an acknowledgement of the indication to enter the SCG dormant state from the SN of the SCG.

In some aspects, an apparatus for wireless communication includes means for receiving an indication that an SCG is to enter an SCG dormant state and an indication for using one or more of CG or SPS for communication with a UE during the SCG dormant state, and means for communicating with the UE during the SCG dormant state using the one or more of CG or SPS.

Aspects generally include a method, apparatus, system, computer program product, non-transitory computer-readable medium, user equipment, base station, master node, secondary node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of dual connectivity deployments, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
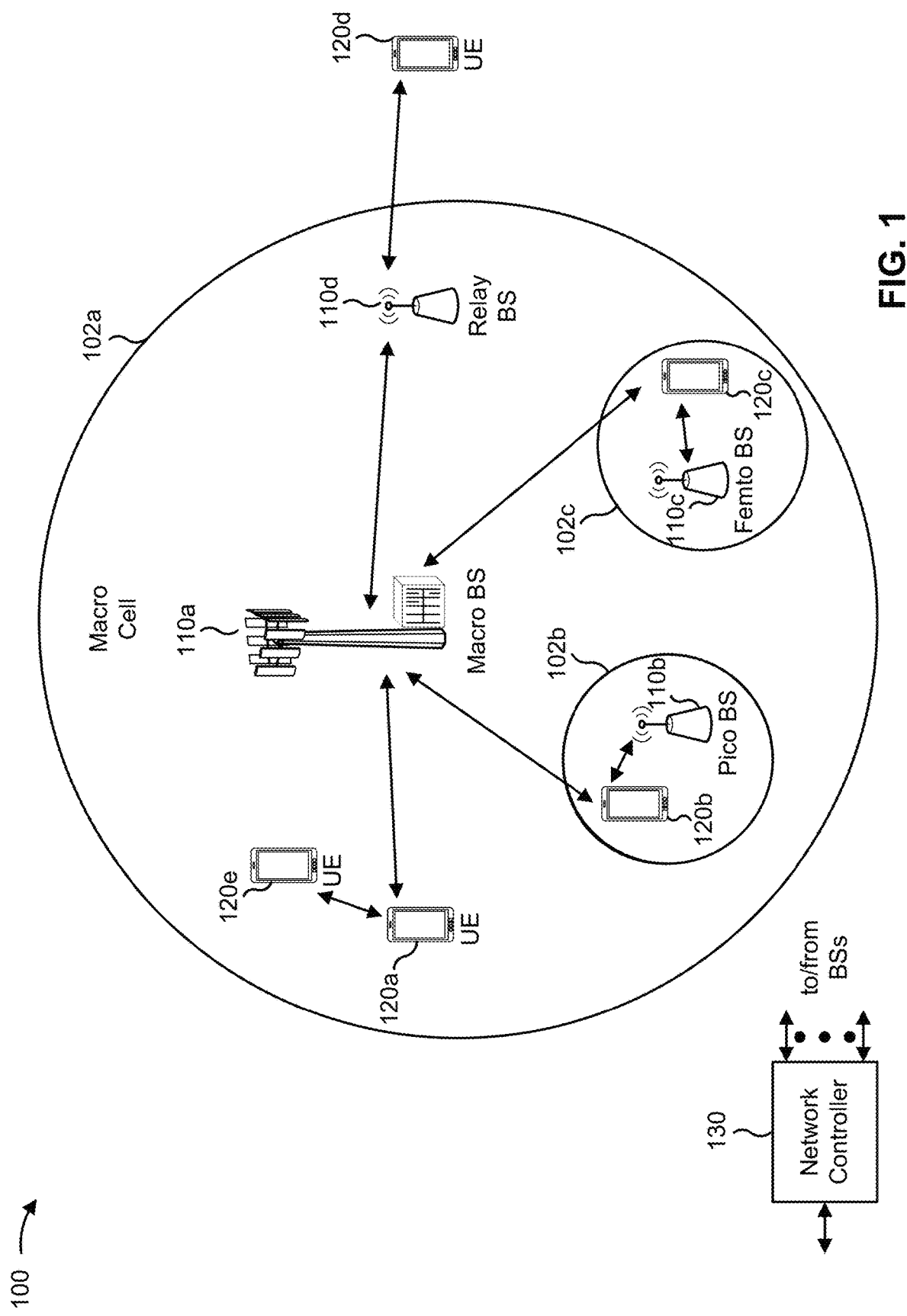
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
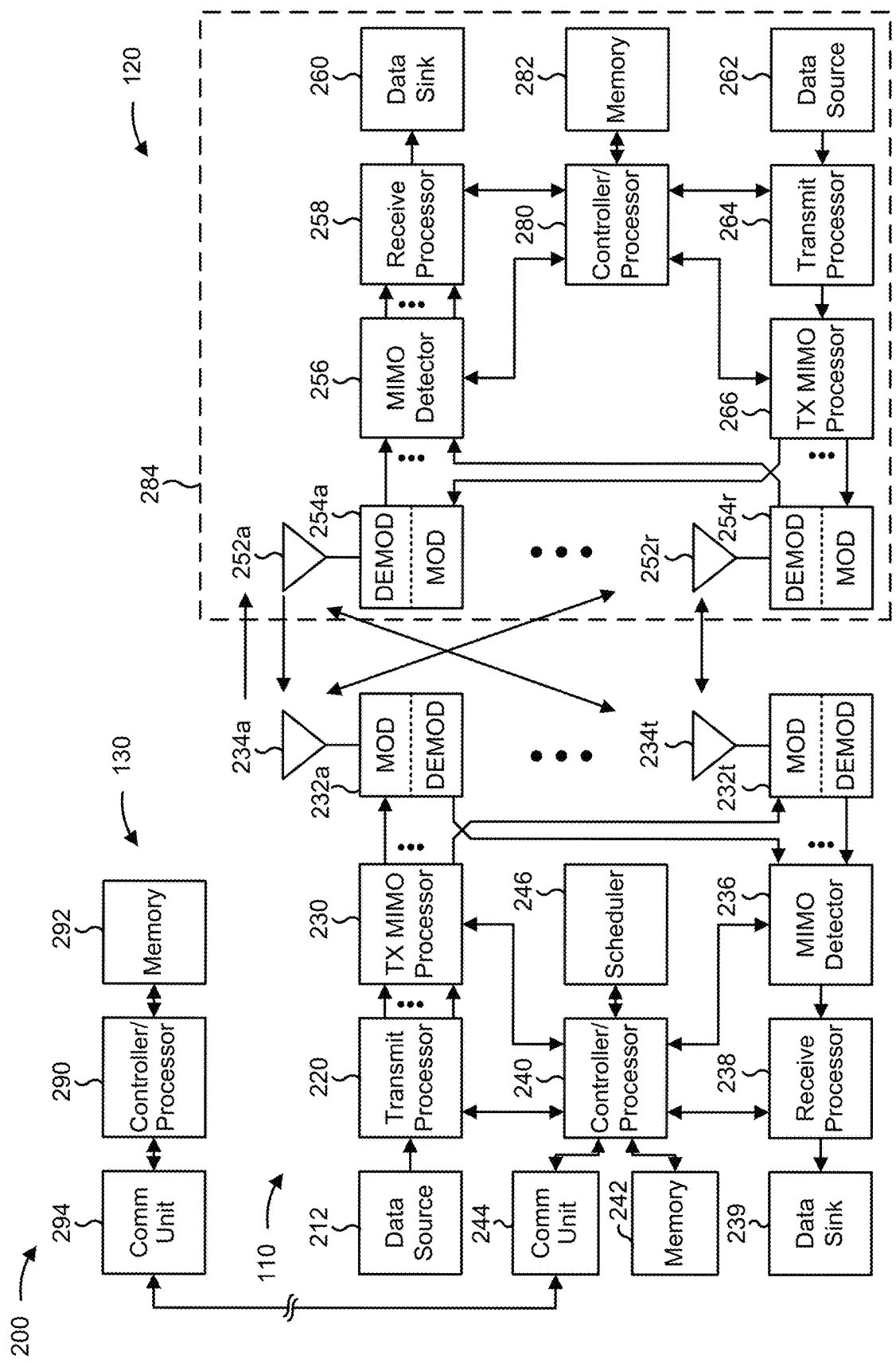
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-16).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-16).

Controller/processor 240 of base station 110, controller/processor 280 of UE 120, and/or any other component(s) of FIG. 2 may perform one or more techniques associated with configured grant (CG) and/or semi-persistent scheduling (SPS) for a dormant secondary cell group (SCG), as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, UE 120 includes means for receiving an indication that an SCG is to enter an SCG dormant state and an indication for using one or more of CG or SPS for communication with a secondary node (SN) of the SCG during the SCG dormant state, and/or means for communicating with the SN of the SCG during the SCG dormant state using the one or more of CG or SPS. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, UE 120 includes means for transmitting an acknowledgment (ACK) on a physical uplink shared channel (PUSCH) for a downlink communication.

In some aspects, UE 120 includes means for transmitting a negative acknowledgment (NACK) on a PUSCH for a downlink communication.

In some aspects, UE 120 includes means for transmitting a retransmission of the uplink communication between CG occasions based at least in part on a received dynamic grant. In some aspects, UE 120 includes means for transmitting a retransmission of the uplink communication in a future CG occasion based at least in part on a received dynamic grant. In some aspects, UE 120 includes means for automatically transmitting a retransmission of the uplink communication in a future CG occasion. In some aspects, UE 120 includes means for transmitting a retransmission of the uplink communication in a same CG occasion using a CG repetition of the uplink communication.

In some aspects, UE 120 includes means for receiving a dynamic grant in an SPS occasion for receiving a retransmission on resources other than SPS occasions. In some aspects, UE 120 includes means for receiving a dynamic grant in an SPS occasion for receiving a retransmission in a future SPS occasion. In some aspects, UE 120 includes means for automatically receiving an SPS retransmission in a future SPS occasion or on one or more resources other than SPS occasions. In some aspects, UE 120 includes means for aligning a downlink monitoring window based at least in part on being configured to use SPS transmissions.

In some aspects, UE 120 includes means for receiving tracking information that includes one or more of a transmit power adjustment command, an uplink beam direction, spatial relationship information, a downlink beam direction, a transmission configuration indicator (TCI) state, or a timing adjustment command from the SN on a physical downlink shared channel (PDSCH).

In some aspects, UE 120 includes means for receiving a measurement trigger on a PDSCH. In some aspects, UE 120 includes means for receiving a reconfiguration for one or more of the CG or the SPS.

In some aspects, the base station 110 of a master cell group (MCG) includes means for transmitting an indication to an SN in an SCG that the SCG is to enter an SCG dormant state and an indication to use one or more of CG or SPS for communication in the SCG during the SCG dormant state, and/or means for transmitting, to a UE, the indication to enter the SCG dormant state and the indication to use one or more of CG or SPS for communication in the SCG during the SCG dormant state based at least in part on receiving an acknowledgement of the indication to enter the SCG dormant state from the SN of the SCG. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, base station 110 of an SCG includes means for receiving an indication that the SCG is to enter an SCG dormant state and an indication for using one or more of CG or SPS for communication with a UE during the SCG dormant state, and/or means for communicating with the UE during the SCG dormant state using the one or more of CG or SPS. The means for base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, base station 110 includes means for transmitting an ACK on a PDSCH for an uplink communication. In some aspects, base station 110 includes means for transmitting a NACK on a PDSCH for an uplink communication. In some aspects, base station 110 includes means for receiving an ACK on a PUSCH for a received downlink communication. In some aspects, base station 110 includes means for receiving a NACK on a PUSCH for a downlink communication.

In some aspects, base station 110 includes means for receiving a retransmission of the uplink communication between CG occasions based at least in part on transmitting a dynamic grant. In some aspects, base station 110 includes means for receiving a retransmission of the uplink communication in a future CG occasion based at least in part on transmitting a dynamic grant. In some aspects, base station 110 includes means for receiving a retransmission of the uplink communication in a same CG occasion of a CG repetition of the uplink communication.

In some aspects, base station 110 includes means for transmitting a dynamic grant in an SPS occasion for transmitting a retransmission on resources other than SPS occasions. In some aspects, base station 110 includes means for transmitting a dynamic grant in an SPS occasion for transmitting a retransmission in a future SPS occasion. In some aspects, base station 110 includes means for automatically transmitting a retransmission in a future SPS occasion or on one or more resources other than SPS occasions.

In some aspects, base station 110 includes means for transmitting tracking information that includes one or more of a transmit power adjustment command, an uplink beam direction, spatial relationship information, a downlink beam direction, a TCI state, or a timing adjustment command on a PDSCH. In some aspects, base station 110 includes means for transmitting a measurement trigger on a PDSCH. In some aspects, base station 110 includes means for transmitting a reconfiguration for one or more of the CG or the SPS.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
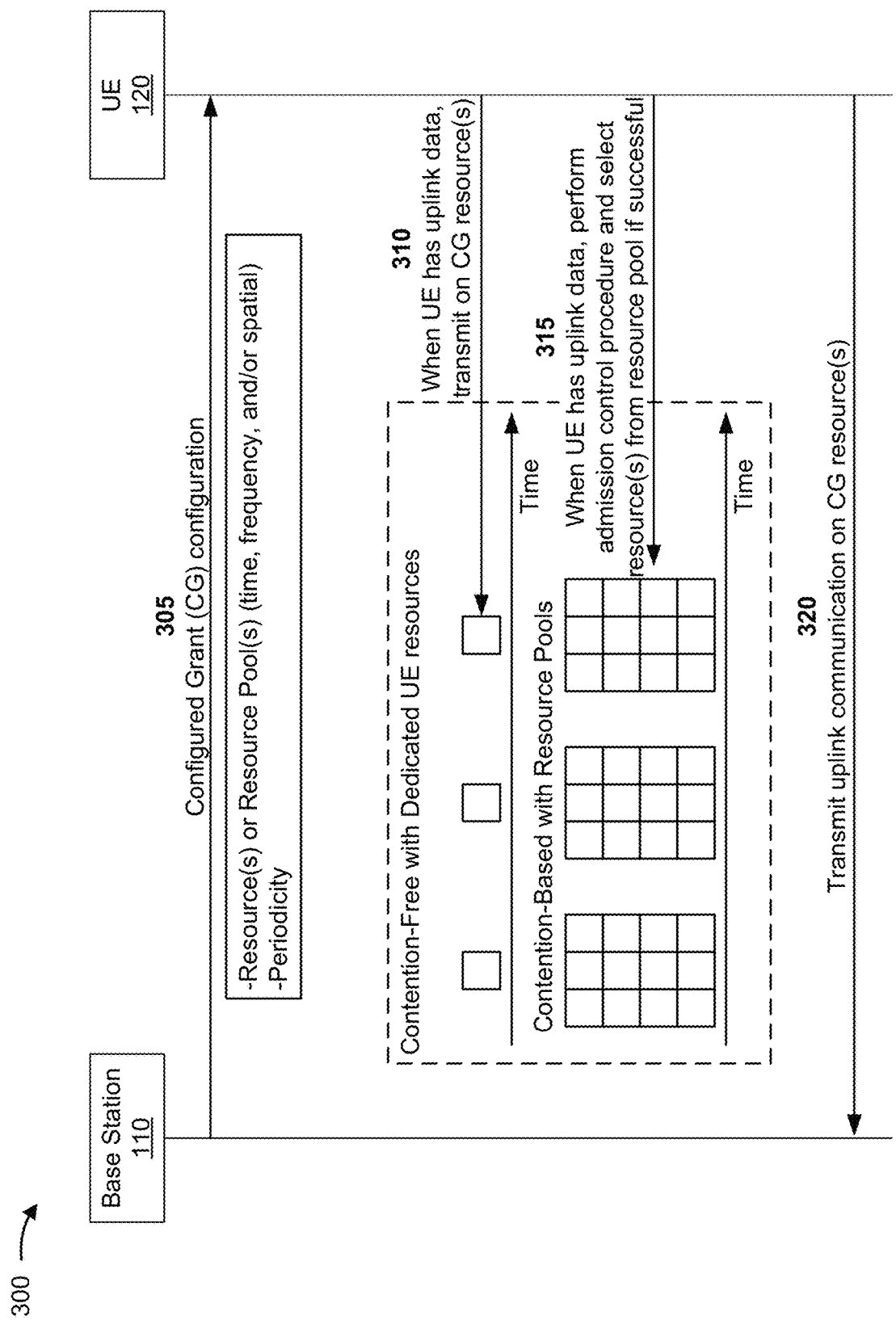
FIG. 3 is a diagram illustrating an example of configured grant (CG) communication, in accordance with the present disclosure.

FIG. 3 is a diagram illustrating an example 300 of CG communication, in accordance with the present disclosure. As shown, example 300 includes a base station (e.g., base station 110) and a UE (e.g., UE 120).

As shown in FIG. 3, and by reference number 305, base station 110 may transmit a CG configuration to UE 120. For example, base station 110 may transmit configuration information (e.g., in a radio resource configuration (RRC) message, in a downlink control information (DCI) message) that identifies the CG. In some aspects, the configuration information identifying the CG may indicate a resource allocation (e.g., in a time domain, frequency domain, spatial domain, code domain) or a periodicity associated with the resource allocation. The CG may identify a resource or set of resources available to UE 120 for transmission of an uplink communication (e.g., data, control information). For example, the CG configuration may identify a resource allocation for a PUSCH. In some aspects, the CG configuration may identify a resource pool or multiple resource pools that may be available to UE 120 for an uplink transmission.

In some aspects, the CG configuration may configure contention-free CG communication with resources dedicated for UE 120 to transmit uplink communications. In this case, the CG configuration may indicate a resource allocation (e.g., in a time domain, frequency domain, spatial domain, code domain) dedicated for UE 120 to use to transmit uplink communications. In some aspects, the CG configuration may configure the resource allocation for UE 120 to occur periodically, such that the resource allocation corresponds to periodically occurring transmission time occasions. As shown in FIG. 3, and by reference number 310, when UE 120 has uplink data to transmit, UE 120 transmits the uplink data in the CG resources identified by the CG configuration. For example, UE 120 transmits the uplink data in one of the CG uplink occasions identified in the CG configuration using the configured resource allocation.

A CG configuration with regular periodic CG uplink occasions with a dedicated resource allocation for UE 120 may be convenient for a UE with periodic uplink traffic (e.g., with trivial jitter). The CG configuration may configure the periodicity associated with the resource allocation to associate CG uplink occasions with periodic nominal arrival times at which traffic to be transmitted to the base station is expected to arrive at (or be ready to be transmitted by) UE 120. However, the actual arrival times at which the traffic arrives (or is ready to be transmitted) by UE 120 may be different than the nominal arrival times, and this difference in times is known as jitter. In some aspects, traffic jittering may be handled by configuring multiple CGs around the nominal arrival times. In some aspects, multiple opportunities for UE 120 to transmit the uplink communication may be defined within a CG uplink occasion. UE 120 may be configured with multiple CG uplinks to allow UE 120 to repeatedly transmit the CG uplink communications and increase the likelihood that the base station receives the communications. NR CG uplink may depend on dynamic grant re-transmission. In some aspects, to suppress a quantity of dynamic grants, the CG can be configured with blind re-transmissions via multiple repetitions per occasion.

In some cases, CG configurations with dedicated resources allocated per UE may be inefficient. For example, CG configurations with dedicated UE resources for a large number of UEs may result in consumption of an excessive amount of PUSCH resources. In this case, a considerable portion of the PUSCH resources may be inefficiently utilized, which reduces system capacity. For example, when multiple CG configurations for a UE are used for de-jittering, only a subset of CG resources may be effectively utilized. In another example, when multiple transmission opportunities are defined per CG uplink occasion, only one opportunity may be effectively utilized. In yet another example, when a blind repetition scheme is used for re-transmissions, a packet may have been already decoded after the first one or more repetitions (early decoding) such that a remainder of the repetitions are unnecessary. Unlike a downlink case, this type of inefficient consumption of system resources cannot be addressed by scheduling, as the base station does not know exactly when traffic will arrive at the UEs.

In some aspects, statistical multiplexing schemes may be used to allocate CG uplink resource access among multiple UEs. Statistical multiplexing of CG uplink communications from multiple UEs may be useful in cases in which there are a high number of UEs associated with somewhat random traffic arrivals at the base station, cases in which a traffic arrival density for traffic arriving at the UEs is time varying, and/or the like. For example, statistical multiplexing of CG uplink communications from multiple UEs may be useful for a network deployment, such as an industrial wireless sensor network, with a large capacity of UEs. In such cases, the uplink traffic associated with at least a group of UEs may be delay insensitive.

As shown in FIG. 3, the CG configuration may configure contention-based CG communication with resource pools that are available for multiple UEs to use to transmit uplink communications. The contention-based CG configuration uses statistical multiplexing to share the resource pools among multiple UEs. A resource pool includes multiple resources (e.g., in a time domain, frequency domain, spatial domain, code domain) that can be allocated for uplink transmission for one or more UEs. For example, an x-axis of an illustrated resource pool may indicate transmission times and a y-axis of the illustrated resource pool may indicate resources (e.g., frequency domain, spatial domain, code domain) that can be allocated at each transmission time. In some aspects, the same resource pools may be configured for multiple UEs.

As further shown in FIG. 3, and by reference number 315, for the contention-based CG configuration, when UE 120 has uplink data to be transmitted, UE 120 performs an admission control procedure and selects one or more resources from the resource pool if the admission control procedure is successful. In some aspects, the admission control procedure may include UE 120 selecting a random number (e.g., between 0 and 1 or some other range), comparing the random number and a threshold, and determining whether the random number satisfies the threshold. If the random number satisfies the threshold, then the admission is successful, and UE 120 selects a resource from the resource pool to transmit the uplink communication.

In some aspects, base station 110 may control the probability of UE 120 accessing the resource pool by setting and/or adjusting the threshold. For example, base station 110 may dynamically adjust the threshold to permit more or fewer UEs to access the resource pool in order to prevent resource collisions. Additionally, or alternatively, base station 110 may assign different thresholds to be used by different UEs.

Based at least in part on UE 120 determining that the random number satisfies the threshold, UE 120 may select a resource from the resource pool to transmit the uplink communication. UE 120 may select the resource from the resource pool using randomized and/or pseudo-randomized resource selection. For example, UE 120 may use a hashing function based at least in part on a UE identifier, time, and/or resource pool index to select the resource from the resource pool.

As further shown in FIG. 3, and by reference number 320, UE 120 transmits the uplink communication to base station 110 on the CG resource. For example, UE 120 may transmit the uplink communication as a PUSCH communication using a resource allocation identified by the CG.

There may be two types of two configured grants. For a first type, RRC signaling may be used for parameter configuration and activation. For a second type, RRC signaling may be used for periodicity configuration, a physical downlink control channel (PDCCH) may be used for activation and parameter configuration, and a medium access control control element (MAC CE) may be used for acknowledgement of an activation signal. If UE 120 is configured with configured grant and UE 120 does not have data to transmit, UE 120 does not transmit the data.

In some aspects, data may also be transmitted using periodic SPS transmissions (occasions) from base station 110 to UE 120. SPS involves periodic resources allocated for an initial transmission of a transport block and dynamic grants schedule retransmissions. SPS transmissions may be sent to UE 120 on a PDSCH without accompanying PDCCH, saving UE 120 extra PDCCH detection, processing, and decoding. UE 120 may be configured to identify preconfigured physical uplink control channel (PUCCH) resources to be used for SPS hybrid automatic repeat request (HARD) feedback. A PUCCH resource may use PUCCH formats 0 or 1, which may support up to two bits of feedback.

As indicated above, FIG. 3 is provided as an example. Other examples may differ from what is described with respect to FIG. 3.

Figure 4:
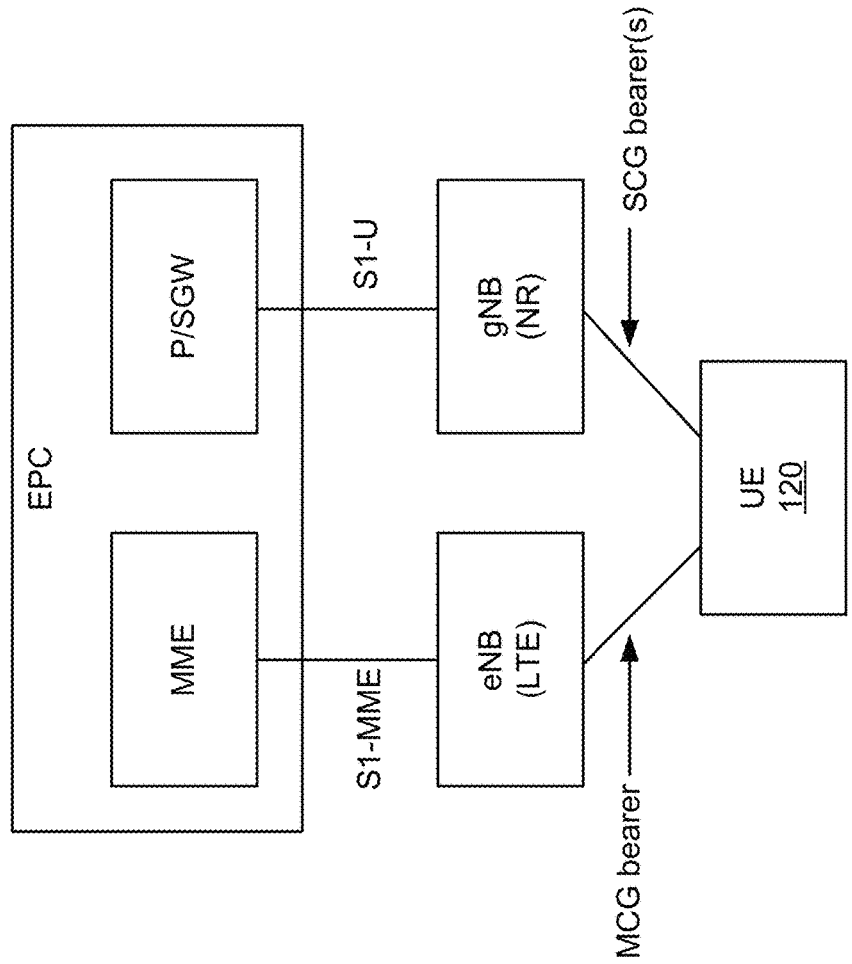
FIG. 4 is a diagram illustrating an example of dual connectivity, in accordance with the present disclosure.

FIG. 4 is a diagram illustrating an example 400 of dual connectivity, in accordance with the present disclosure. The example shown in FIG. 4 is for an Evolved Universal Mobile Telecommunications System Terrestrial Radio Access (E-UTRA)-NR dual connectivity (ENDC) mode. In the ENDC mode, a UE, such as UE 120, communicates using an LTE RAT on an MCG, and UE 120 communicates using an NR RAT on an SCG. However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, a dual connectivity mode may refer to an ENDC mode, a NEDC mode, an NRDC mode, and/or another type of dual connectivity mode.

As shown in FIG. 4, UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 4, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 4, in some aspects, a wireless network that permits operation in a 5G NSA mode may permit such operations using an MCG for a first RAT (e.g., an LTE RAT, a 4G RAT) and an SCG for a second RAT (e.g., an NR RAT, a 5G RAT). In this case, UE 120 may communicate with the eNB via the MCG and may communicate with the gNB via the SCG. In some aspects, the MCG may anchor a network connection between UE 120 and the 4G/LTE core network (e.g., for mobility, coverage, control plane information), and the SCG may be added as additional carriers to increase throughput (e.g., for data traffic, user plane information). In some aspects, the gNB and the eNB may not transfer user plane information between one another. In some aspects, UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

UE 120 may communicate via the MCG and the SCG using one or more radio bearers (e.g., data radio bearers (DRBs), signaling radio bearers (SRBs), and/or the like). For example, UE 120 may transmit or receive data via the MCG and/or the SCG using one or more DRBs. Similarly, UE 120 may transmit or receive control information (e.g., RRC information, measurement reports) using one or more SRBs. In some aspects, a radio bearer may be dedicated to a specific cell group (e.g., a radio bearer may be an MCG bearer, an SCG bearer). In some aspects, a radio bearer may be a split radio bearer. A split radio bearer may be split in the uplink and/or in the downlink. For example, a DRB may be split on the downlink (e.g., UE 120 may receive downlink information for the MCG or the SCG in the DRB) but not on the uplink (e.g., the uplink may be non-split with a primary path to the MCG or the SCG, such that UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, UE 120 may transmit data to the MCG or the SCG using the DRB.

As indicated above, FIG. 4 is provided as an example. Other examples may differ from what is described with respect to FIG. 4.

FIG. 5 is a diagram illustrating an example 500 of dual connectivity deployments, in accordance with the present disclosure.

FIG. 5 shows a first scenario that is a deployment of NRDC intra-band carrier aggregation (CA). An MCG may operate in FR1, and an SCG may operate in FR2. Measurements on a primary secondary cell (PSCell) of the SCG may be expected to be highly correlated to measurements on secondary cells (SCells) of the SCG. Therefore, PSCell measurements may be sufficient.

FIG. 5 also shows a second scenario that is a deployment of ENDC inter-band CA. An MCG may in LTE frequency bands, and an SCG may operate in both FR1 and FR2. For example, a PSCell of the SCG may operate in FR1, and SCells may operate in FR2. Measurements on the PSCell are likely uncorrelated to measurements on SCells. Therefore, measurements may be required on PSCell and SCells. For example, quasi-colocations or spatial relationships on the PSCell and SCells may be much different.

As indicated above, FIG. 5 is provided as an example. Other examples may differ from what is described with regard to FIG. 5.

In a dual connectivity scenario (e.g., ENDC, NRDC), an SCG may be activated and deactivated. Being active consumes power, signaling resources, and processing resources, and thus an SCG may be deactivated. An SCG may also be deactivated if there is bursty traffic, a UE is overheating, or if there are certain types of traffic (e.g., voice). However, measurement reporting and other preparatory signaling may not take place while an SCG is deactivated. Furthermore, latency is introduced, and resources are also consumed when activating or deactivating an SCG. In some aspects, an SCG may enter an SCG dormant state rather than a deactivated state. In SCG dormant state, for secondary cells, there may be no downlink control, downlink data monitoring, uplink sounding reference signals (SRSs, or PUSCH transmissions. Some radio resource management (RRM), channel state information (CSI), and beam failure detection measurements may be required during the SCG dormant state, and such measurements are usually reported through a PSCell that is in an active state. Operation in FR2 may require other signaling, measurements, and sounding procedures for beam management.

A UE may perform some measurements on a PSCell or SCells in an SCG dormant state, but an MCG is not dormant. The MCG and the SCG may not be synchronized and certain measurements may be inaccurate. Furthermore, sending measurements between the MCG and the SCG may require too much modification and introduce too much latency. Therefore, a PSCell of the SCG may report some measurements, especially Layer 1 (L1) measurements, and there may be tradeoffs between power consumption, performance, and latency. PSCell reporting may reduce latency and improve performance when bringing an SCG out of the SCG dormant state, such as when a dormant bandwidth part (BWP) overlaps with a non-dormant BWP.

In order to send measurement reports through a dormant PSCell, timing, transmit power, TCI states, and spatial relations may need to be maintained. This may require the enabling of a PUCCH, a PDCCH, a PDSCH, and a PUSCH on the PSCell. However, enabling these physical channels may cause excessive signaling and power consumption for a UE.

According to various aspects described herein, a UE (e.g., UE 120) may use preconfigured resources, such as CG for uplink communications and SPS for downlink communications between the PSCell and an SN of the SCG during an SCG dormant state. For example, a UE may be configured for CG, SPS, or both CG and SPS. If configured for CG, the UE may transmit measurement information and/or SRSs in CG occasions on the PUSCH to the SN. If CG only is configured (no SPS), CG may be configured with no downlink or PDCCH. If configured for SPS, the UE may receive tracking information (e.g., timing advance commands, transmit power commands, beam updates), measurement information, and/or configuration information in SPS transmissions on the PDSCH from the SN. SPS only may be configured (no CG). PUCCH may be used on the uplink. The CG and/or SPS may be configured with a particular periodicity. In this way, a UE may reduce control overhead and reduce power consumption.

In some aspects, if the UE is configured for both CG and SPS, the periodicity for each of CG and SPS may be configured such that there is a minimal offset between some or all CG occasions and SPS transmissions. As a result, CG occasions and SPS transmissions may avoid collisions, provide adequate resources, and be closer together in time so as to limit an active time of the PSCell. A downlink monitoring window may be aligned with each SPS transmission.

Figure 6:
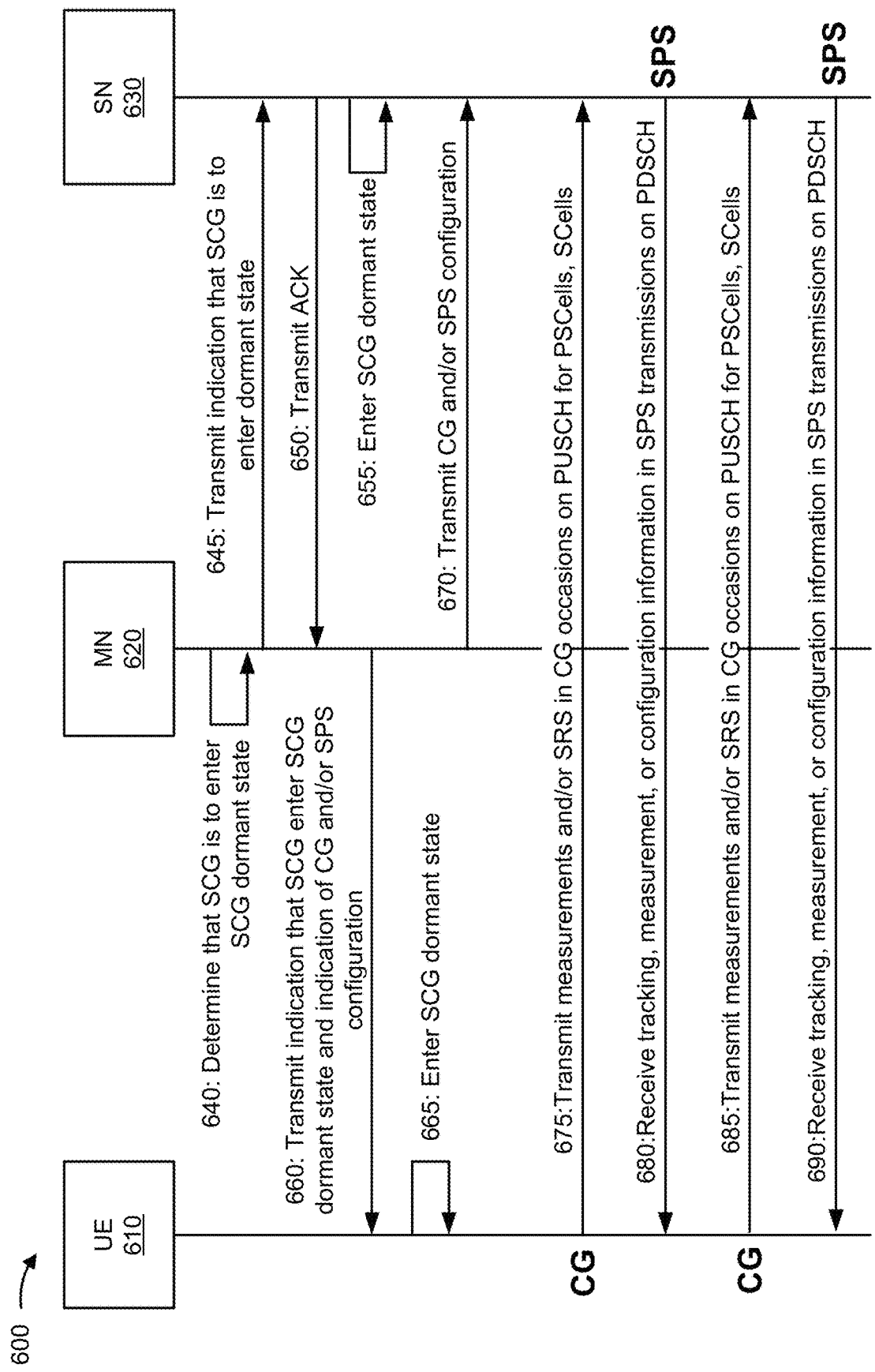
FIG. 6 is a diagram illustrating an example associated with a UE configured with CG and semi-persistent scheduling (SPS) for a secondary cell group dormant state, in accordance with the present disclosure.

FIG. 6 is a diagram illustrating an example 600 associated with a UE configured with CG and SPS for an SCG dormant state, in accordance with the present disclosure. As shown in FIG. 6, a UE 610 (e.g., a UE 120), a master node (MN) 620 (e.g., a base station 110 of an MCG), and an SN 630 (e.g., a base station 110 of an SCG) may communicate with one another. The CG and/or SPS configurations may be used by UE 610 and SN 630 on a PSCell. In some aspects, only PDSCH may be configured on the downlink for SPS, and only PUSCH may be configured on the uplink for CG.

As show by reference number 640, MN 620 may determine that the SCG is to enter an SCG dormant state. This may be due to issues at the UE, a traffic type, and/or channel conditions, among other reasons. As shown by reference number 645, MN 620 may transmit an indication to SN 630 that the SCG is to enter the SCG dormant state. SN 630 may acknowledge the indication, as shown by reference number 650. Accordingly, SN 630 may operate as if the SCG is in the SCG dormant state, as shown by reference number 655.

If MN 620 receives an acknowledgement, MN 620 may transmit the same indication to UE 610, as shown by reference number 660. The indication may be accompanied by an indication of the CG and/or SPS configuration, depending on whether the UE is to be configured for CG, for SPS, or for both. As shown by reference number 665, UE 610 may operate as if the SCG is in the SCG dormant state. As shown by reference number 670, SN 630 may also receive an indication of the CG and/or SPS configuration.

If configured for CG, UE 610 may communicate with SN 630 using CG occasions of a certain period. If configured for SPS, SN 630 may communicate with UE 610 using SPS transmissions of a certain period. In example 600, UE 610 and SN 630 are configured to use both CG and SPS.

As shown by reference number 675, UE 610 may transmit measurement information (e.g., CSI reports, L1 measurements) and/or SRSs in a first CG occasion on the PUSCH to SN 630. HARQ feedback for downlink messages may be sent to SN 630 using PUSCH on a CG occasion. UE 610 may derive uplink tracking information, such as transmit power, from PUSCH/SRS communications. As shown by reference number 680, UE 610 may receive tracking information (e.g., timing advance commands, transmit power commands, beam updates as TCI states or spatial relations), measurement information, and/or measurement configuration information in a first SPS transmission on the PDSCH from SN 630. UE 610 may also receive L1 measurement triggers, configurations, resource sets, and/or reference signals on the PDSCH. As shown by reference number 685, UE 610 may transmit measurement information and/or SRSs in a second CG occasion on the PUSCH. As shown by reference number 690, UE 610 may receive tracking information, measurement information, and/or configuration information in a second SPS transmission on the PDSCH.

As indicated above, FIG. 6 is provided as an example. Other examples may differ from what is described with regard to FIG. 6.

Figure 7:
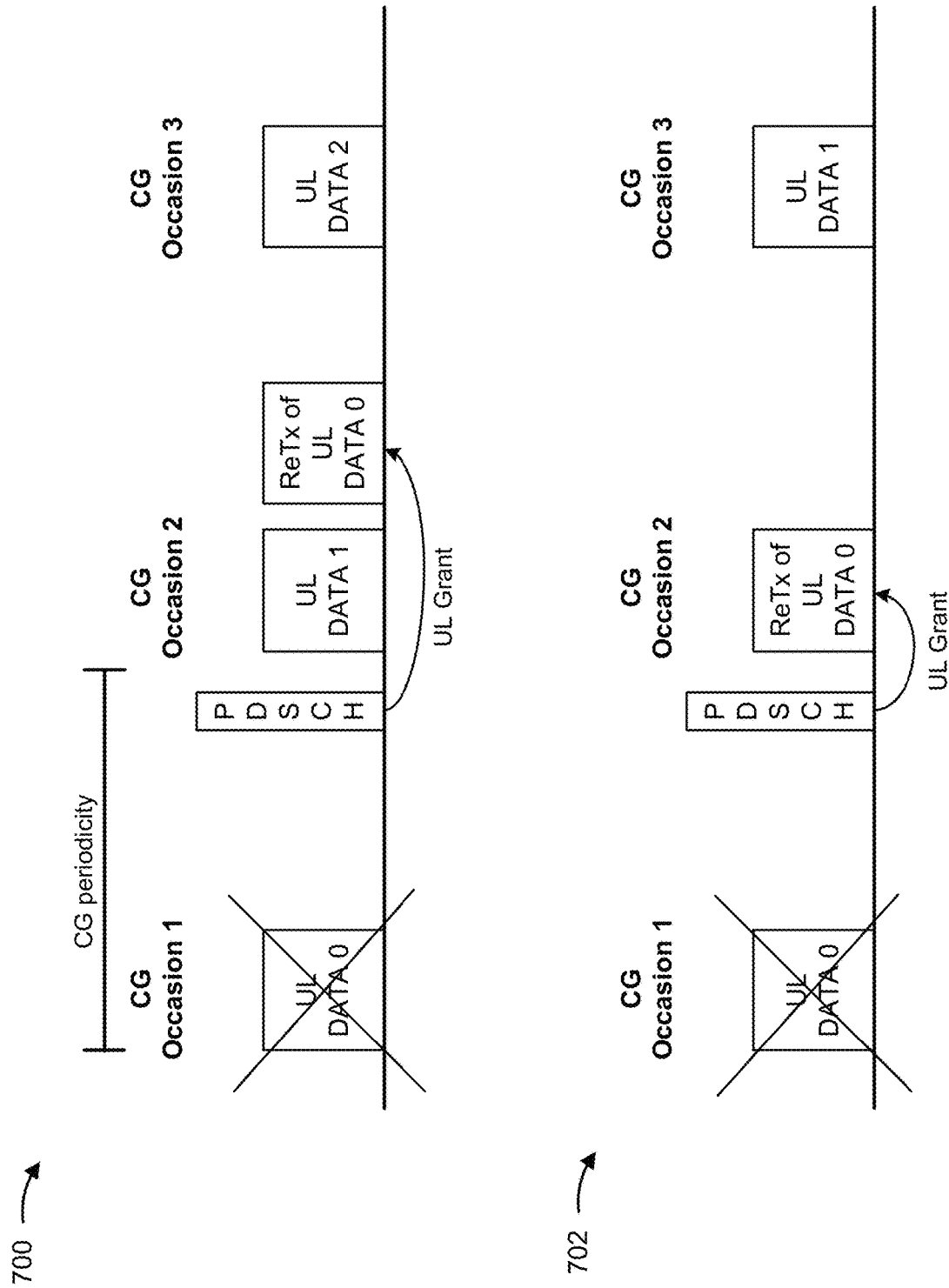
FIG. 7 is a diagram illustrating examples of CG occasions, in accordance with the present disclosure.

FIG. 7 is a diagram illustrating examples 700 and 702 of CG occasions, in accordance with the present disclosure.

If a data packet (e.g., UL DATA 0) by a UE is not received by an SN, the UE may retain the data in its buffer for a time specified by CG retransmission timer. If the timer has not expired, the SN may send a dynamic uplink grant in an SPS occasion on the PDSCH (or on the PDCCH) to point to a newly allocated resource (other than a CG occasion) or another CG occasion. Example 700 shows an example of using a newly allocated resource (for retransmission of UL DATA 0). Example 702 is an example of using another CG occasion (CG Occasion 3). In some aspects, the dynamic grant may be transmitted in a MAC CE, DCI, or an RRC message.

As indicated above, FIG. 7 provides examples. Other examples may differ from what is described with regard to FIG. 7.

Figure 8:
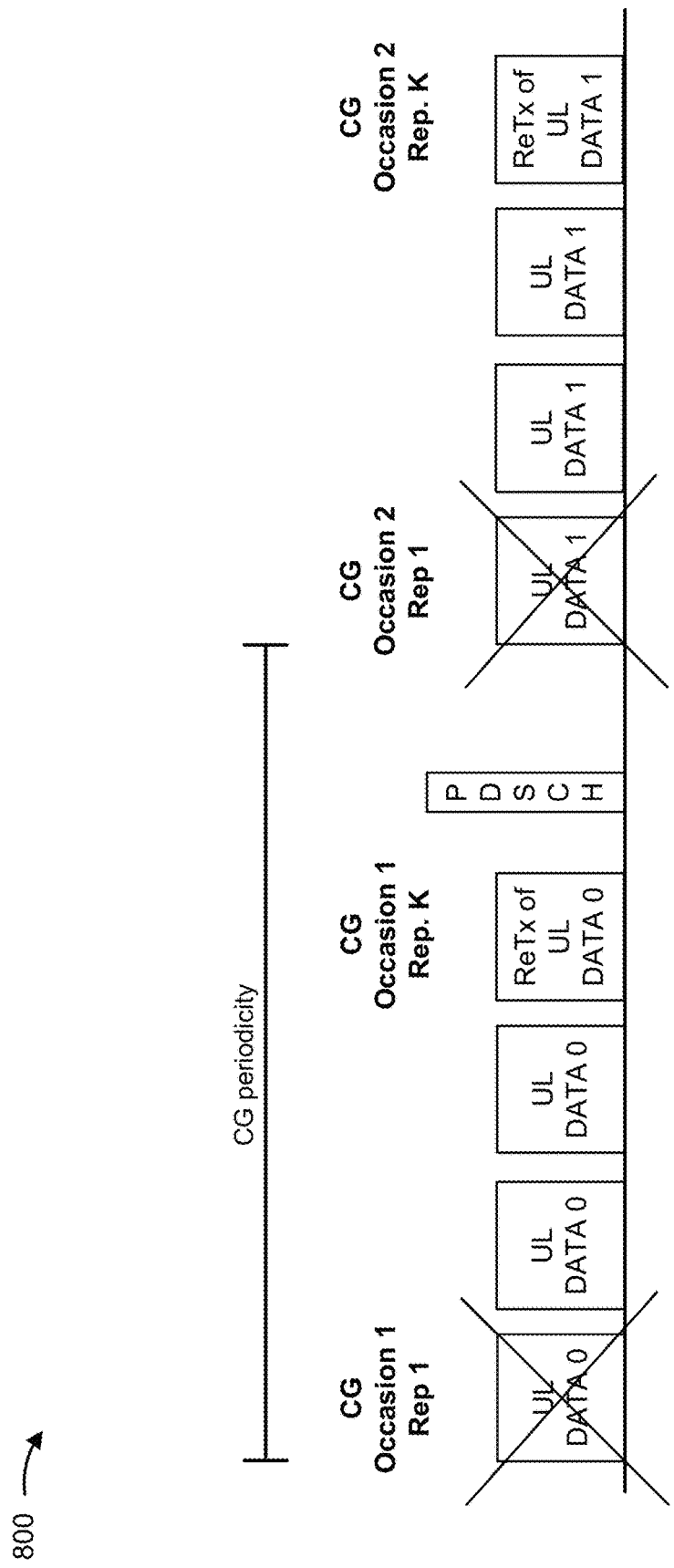
FIG. 8 is a diagram illustrating an example of CG occasions, in accordance with the present disclosure.

FIG. 8 is a diagram illustrating an example 800 of CG occasions, in accordance with the present disclosure.

Example 800 shows an example of message repetition for CG occasions, where the UE may send a message K times for each CG occasion to increase a probability of reception by an SN. If a data packet (e.g., UL DATA 0) is not received in a first repetition of a CG occasion, the data packet (retransmission of UL DATA 0) may be received in another ($2^{nd}$ to Kth) repetition of the same CG occasion.

As indicated above, FIG. 8 is provided as an example. Other examples may differ from what is described with respect to FIG. 8.

Figure 9:
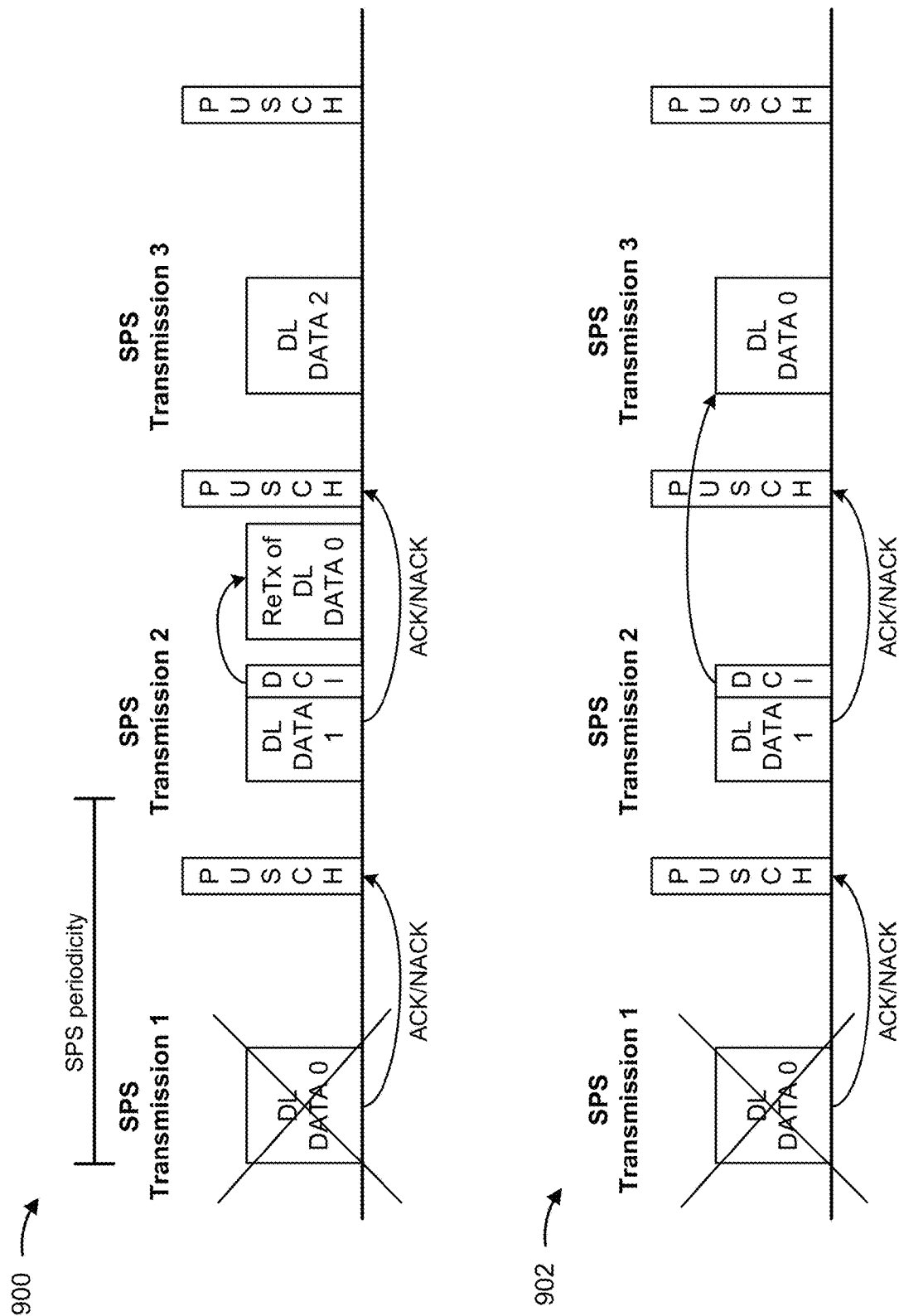
FIG. 9 is a diagram illustrating examples of SPS transmissions, in accordance with the present disclosure.

FIG. 9 is a diagram illustrating examples 900 and 902 of SPS transmissions, in accordance with the present disclosure.

If data (e.g., DL DATA 0) in an SPS transmission is not decoded by a UE, the UE may send a NACK on a PUSCH (if CG is configured) to an SN. The SN may use a dynamic grant to reschedule a retransmission. The SN may send the dynamic grant on DCI on another SPS transmission (DCI on a PDSCH, which may be equivalent to a MAC CE). The DCI or the MAC CE may point to a new resource (other than an SPS transmission) for a retransmission (of DL DATA 0), such as shown by example 900. The DCI or the MAC CE may also point to another SPS transmission (e.g., SPS transmission 3), such as shown by example 902.

As indicated above, FIG. 9 provides some examples. Other examples may differ from what is described with regard to FIG. 9.

Figure 10:
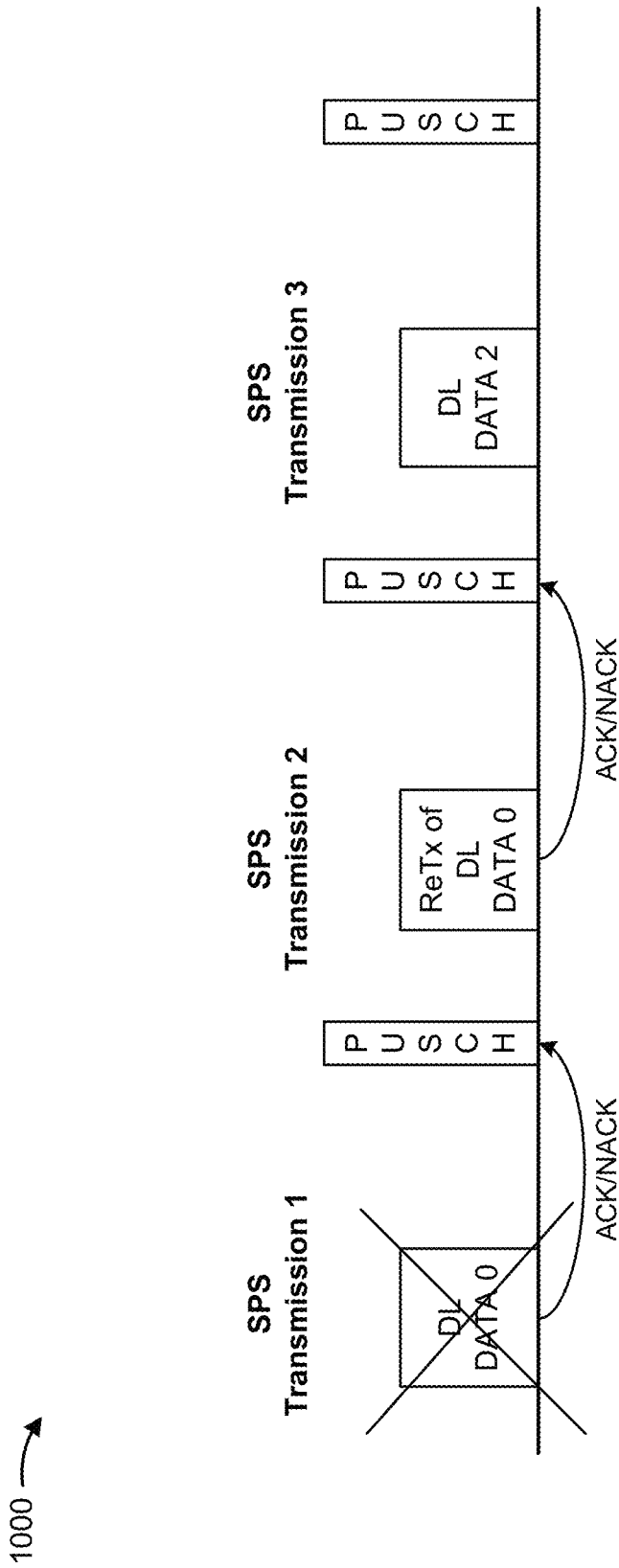
FIG. 10 is a diagram illustrating an example of SPS transmissions, in accordance with the present disclosure.

FIG. 10 is a diagram illustrating an example 1000 of SPS transmissions, in accordance with the present disclosure.

In order to save signaling overhead, retransmissions may automatically occur in SPS transmissions, either in a next SPS occasion or in a resource other than an SPS occasion. For example, the UE may be pre-configured to expect a retransmission in a next SPS transmission (e.g., SPS transmission 2) or a certain quantity of SPS transmissions from the original transmission.

As indicated above, FIG. 10 is provided as an example. Other examples may differ from what is described with regard to FIG. 10.

The PSCell may operate under multiple nodes. In PSCell mode 0, PDSCH (SPS) is used for downlink, PUCCH/PUSCH is used for uplink, and MAC CE is used for signaling. In PSCell mode 1, PDCCH/PDSCH is used for downlink, PUSCH (CG) is used for uplink, and MAC CE is used for signaling. In PSCell mode 2, PDSCH (SPS) is used for downlink, PUSCH (CG) is used for uplink, and MAC CE is used for signaling.

If the PDCCH is not activated on a PSCell, a parameter change may be signaled via a MAC CE. If the PDSCH and/or the PUSCH is enabled, then MAC layer signaling may be used. Transmission power control (TPC) for an SRS or the PUCCH that is usually indicated using the DCI may be communicated using MAC layer signaling. For updating a timing parameter, a timing advance on the PUCCH, an SRS, or the PUSCH may be signaled using a MAC CE. For a transmit power parameter, TPC may be signaled with a MAC CE (rather than DCI) for the PUCCH, an SRS, or the PUSCH. For downlink TCI states, a MAC CE may be used for the PDCCH or the PDSCH. For spatial relations, a MAC CE be used for the PUCCH or the PUSCH.

Figure 11:
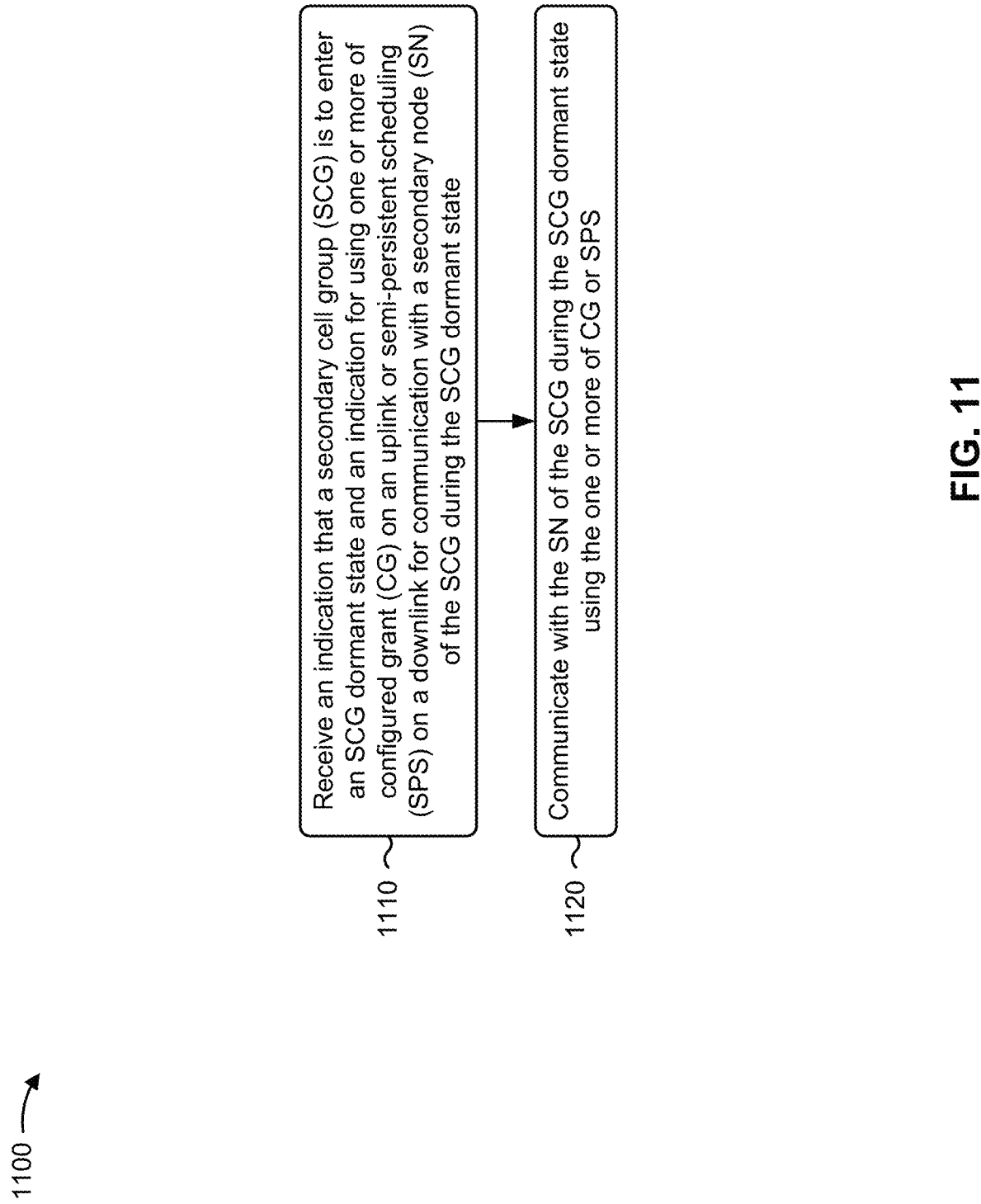
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with CG and/or SPS for a dormant SCG.

As shown in FIG. 11, in some aspects, process 1100 may include receiving an indication that an SCG is to enter an SCG dormant state and an indication for using one or more of CG or SPS for communication with an SCG of the SCG during the SCG dormant state (block 1110). For example, the UE (e.g., using reception component 1402 depicted in FIG. 14) may receive an indication that an SCG is to enter an SCG dormant state and an indication for using one or more of CG or SPS for communication with an SCG of the SCG during the SCG dormant state, as described above in connection with FIGS. 3-10.

As further shown in FIG. 11, in some aspects, process 1100 may include communicating with the SN of the SCG during the SCG dormant state using the one or more of CG or SPS (block 1120). For example, the UE (e.g., using communication component 1408 depicted in FIG. 14) may communicate with the SN of the SCG during the SCG dormant state using the one or more of CG or SPS, as described above in connection with FIGS. 3-10.

Process 1100 may include additional aspects, such as any single aspect or any combination of aspects described below and/or in connection with one or more other processes described elsewhere herein.

In a first aspect, communicating with the SN of the SCG during the SCG dormant state using the CG includes transmitting one or more of measurement reports, or an SRS to the SN of the SCG in a PUSCH using CG occasions.

In a second aspect, alone or in combination with the first aspect, process 1100 includes transmitting an ACK on a PUSCH for a downlink communication.

In a third aspect, alone or in combination with one or more of the first and second aspects, process 1100 includes transmitting a NACK on a PUSCH for a downlink communication.

In a fourth aspect, alone or in combination with one or more of the first through third aspects, process 1100 includes transmitting a retransmission of the uplink communication between CG occasions based at least in part on a received dynamic grant.

In a fifth aspect, alone or in combination with one or more of the first through fourth aspects, process 1100 includes transmitting a retransmission of the uplink communication in a future CG occasion based at least in part on a received dynamic grant.

In a sixth aspect, alone or in combination with one or more of the first through fifth aspects, process 1100 includes automatically transmitting a retransmission of the uplink communication in a future CG occasion.

In a seventh aspect, alone or in combination with one or more of the first through sixth aspects, process 1100 includes transmitting a retransmission of the uplink communication in a same CG occasion using a CG repetition of the uplink communication.

In an eighth aspect, alone or in combination with one or more of the first through seventh aspects, communicating with the SN of the SCG during the SCG dormant state using the SPS includes receiving one or more of tracking information, measurement information, or measurement configuration information from the SN of the SCG on a PDSCH using SPS transmissions.

In a ninth aspect, alone or in combination with one or more of the first through eighth aspects, process 1100 includes transmitting an ACK on a PUSCH for a received downlink communication.

In a tenth aspect, alone or in combination with one or more of the first through ninth aspects, process 1100 includes transmitting a NACK on a PUSCH for a downlink communication.

In an eleventh aspect, alone or in combination with one or more of the first through tenth aspects, process 1100 includes receiving a dynamic grant in an SPS occasion for receiving a retransmission on resources other than SPS occasions.

In a twelfth aspect, alone or in combination with one or more of the first through eleventh aspects, receiving the dynamic grant includes receiving the dynamic grant via a MAC CE, DCI, or an RRC message.

In a thirteenth aspect, alone or in combination with one or more of the first through twelfth aspects, process 1100 includes receiving a dynamic grant in an SPS occasion for receiving a retransmission in a future SPS occasion.

In a fourteenth aspect, alone or in combination with one or more of the first through thirteenth aspects, process 1100 includes automatically receiving an SPS retransmission in a future SPS occasion or on one or more resources other than SPS occasions.

In a fifteenth aspect, alone or in combination with one or more of the first through fourteenth aspects, communicating with the SN of the SCG during the SCG dormant state using the SPS includes receiving tracking information from the SN of the SCG on a PDSCH using SPS transmissions.

In a sixteenth aspect, alone or in combination with one or more of the first through fifteenth aspects, process 1100 includes aligning a downlink monitoring window based at least in part on being configured to use SPS transmissions.

In a seventeenth aspect, alone or in combination with one or more of the first through sixteenth aspects, process 1100 includes receiving tracking information that includes one or more of a transmit power adjustment command, an uplink beam direction, spatial relationship information, a downlink beam direction, a TCI state, or a timing adjustment command from the SN on a PDSCH.

In an eighteenth aspect, alone or in combination with one or more of the first through seventeenth aspects, receiving the tracking information includes receiving the tracking information in a MAC CE on the PDSCH.

In a nineteenth aspect, alone or in combination with one or more of the first through eighteenth aspects, process 1100 includes receiving a measurement trigger on a PDSCH.

In a twentieth aspect, alone or in combination with one or more of the first through nineteenth aspects, process 1100 includes receiving a reconfiguration for one or more of the CG or the SPS.

In a twenty-first aspect, alone or in combination with one or more of the first through twentieth aspects, communicating with the SN of the SCG during the SCG dormant state using the CG or SPS includes receiving one or more of tracking information, measurement information, or measurement configuration information from the SN of the SCG on a PDSCH using SPS transmissions, and transmitting one or more of measurement information or an SRS to the SN of the SCG on a PUSCH using CG occasions, and SPS occasions are separated from CG occasions by an offset that satisfies an offset threshold.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
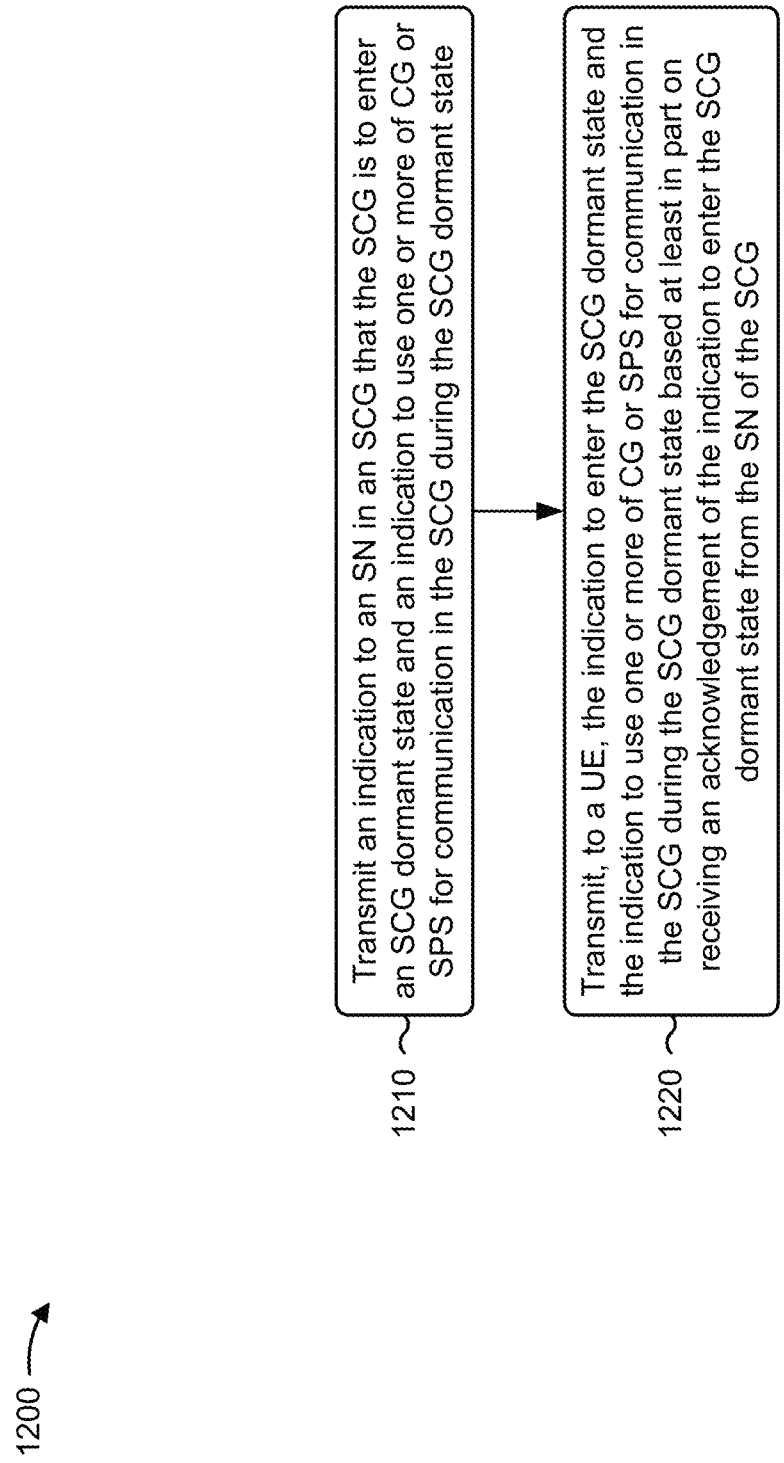
FIG. 12 is a diagram illustrating an example process performed, for example, by a base station, in accordance with the present disclosure.

FIG. 12 is a diagram illustrating an example process 1200 performed, for example, by a base station of an MCG (e.g., MN), in accordance with the present disclosure. Example process 1200 is an example where the base station (e.g., base station 110, MN) performs operations associated with CG and/or SPS for a dormant SCG.

As shown in FIG. 12, in some aspects, process 1200 may include transmitting an indication to an SN in an SCG that the SCG is to enter an SCG dormant state and an indication to use one or more of CG or SPS for communication in the SCG during the SCG dormant state (block 1210). For example, the base station (e.g., using transmission component 1504 depicted in FIG. 15) may transmit an indication to an SN in an SCG that the SCG is to enter an SCG dormant state and an indication to use one or more of CG or SPS for communication in the SCG during the SCG dormant state, as described above in connection with FIGS. 3-10.

As further shown in FIG. 12, in some aspects, process 1200 may include transmitting, to a UE, the indication to enter the SCG dormant state and the indication to use one or more of CG or SPS for communication in the SCG during the SCG dormant state based at least in part on receiving an acknowledgement of the indication to enter the SCG dormant state from the SN of the SCG (block 1220). For example, the base station (e.g., using transmission component 1504 depicted in FIG. 15) may transmit, to a UE, the indication to enter the SCG dormant state and the indication to use one or more of CG or SPS for communication in the SCG during the SCG dormant state based at least in part on receiving an acknowledgement of the indication to enter the SCG dormant state from the SN of the SCG, as described above in connection with FIGS. 3-10.

Process 1200 may include additional aspects, such as any single aspect or any combination of aspects described below and/or in connection with one or more other processes described elsewhere herein.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
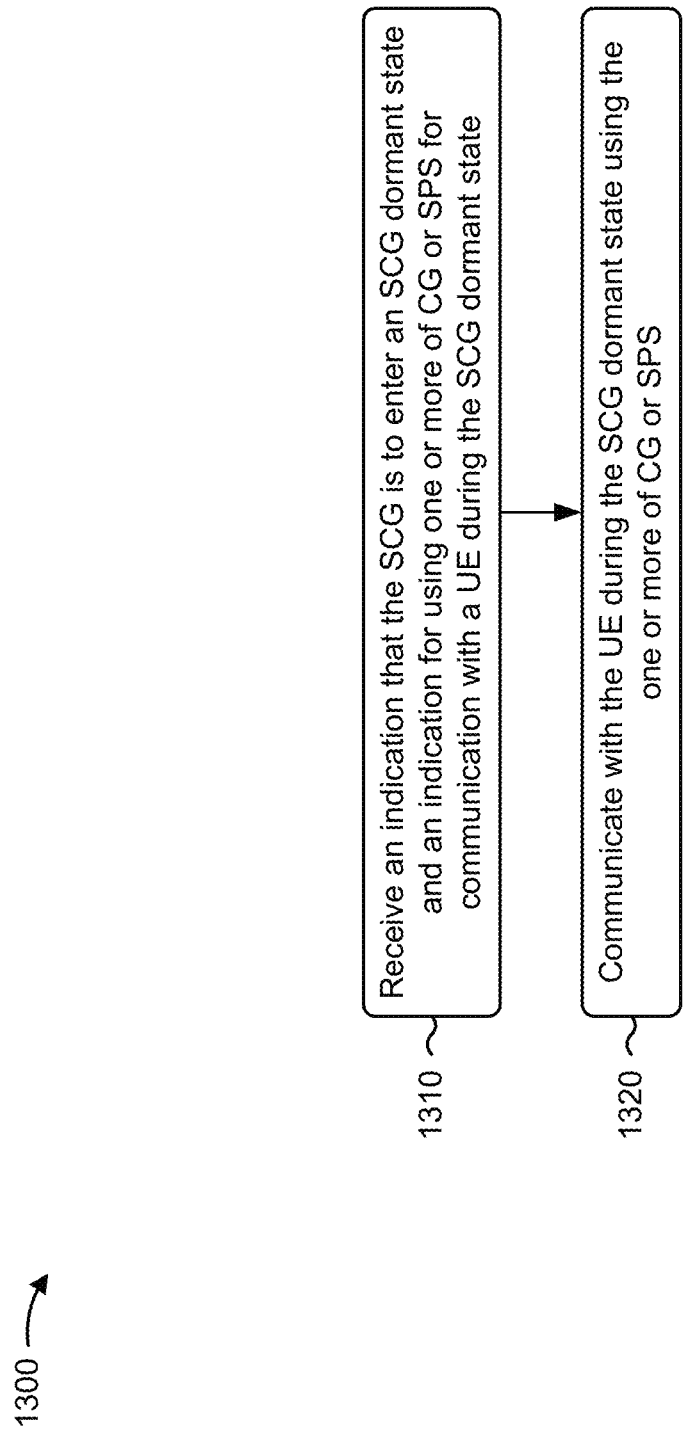
FIG. 13 is a diagram illustrating an example process performed, for example, by a base station, in accordance with the present disclosure.

FIG. 13 is a diagram illustrating an example process 1300 performed, for example, by a base station of an SCG (e.g., SN), in accordance with the present disclosure. Example process 1300 is an example where the base station (e.g., base station 110, SN) performs operations associated with CG and/or SPS for a dormant SCG.

As shown in FIG. 13, in some aspects, process 1300 may include receiving an indication that the SCG is to enter an SCG dormant state and an indication for using one or more of CG or SPS for communication with a UE during the SCG dormant state (block 1310). For example, the base station (e.g., using reception component 1602 depicted in FIG. 16) may receive an indication that the SCG is to enter an SCG dormant state and an indication for using one or more of CG or SPS for communication with a UE during the SCG dormant state, as described above in connection with FIGS. 3-10.

As further shown in FIG. 13, in some aspects, process 1300 may include communicating with the UE during the SCG dormant state using the one or more of CG or SPS (block 1320). For example, the base station (e.g., using communication component 1608 depicted in FIG. 16) may communicate with the UE during the SCG dormant state using the one or more of CG or SPS, as described above in connection with FIGS. 3-10.

Process 1300 may include additional aspects, such as any single aspect or any combination of aspects described below and/or in connection with one or more other processes described elsewhere herein.

In a first aspect, communicating with the UE during the SCG dormant state using the one or more of CG or SPS includes receiving one or more of measurement information or an SRS from the UE on a PUSCH using CG occasions.

In a second aspect, alone or in combination with the first aspect, process 1300 includes transmitting an ACK on a PDSCH for an uplink communication.

In a third aspect, alone or in combination with one or more of the first and second aspects, process 1300 includes transmitting a NACK on a PDSCH for an uplink communication.

In a fourth aspect, alone or in combination with one or more of the first through third aspects, process 1300 includes receiving a retransmission of the uplink communication between CG occasions based at least in part on transmitting a dynamic grant.

In a fifth aspect, alone or in combination with one or more of the first through fourth aspects, process 1300 includes receiving a retransmission of the uplink communication in a future CG occasion based at least in part on transmitting a dynamic grant.

In a sixth aspect, alone or in combination with one or more of the first through fifth aspects, process 1300 includes receiving a retransmission of the uplink communication in a same CG occasion of a CG repetition of the uplink communication.

In a seventh aspect, alone or in combination with one or more of the first through sixth aspects, communicating with the UE during the SCG dormant state using the one or more of CG or SPS includes transmitting one or more of tracking information, measurement information, or measurement configuration information to the UE on a PDSCH using SPS transmissions.

In an eighth aspect, alone or in combination with one or more of the first through seventh aspects, process 1300 includes receiving an ACK on a PUSCH for a received downlink communication.

In a ninth aspect, alone or in combination with one or more of the first through eighth aspects, process 1300 includes receiving a NACK on a PUSCH for a downlink communication.

In a tenth aspect, alone or in combination with one or more of the first through ninth aspects, process 1300 includes transmitting a dynamic grant in an SPS occasion for transmitting a retransmission on resources other than SPS occasions.

In an eleventh aspect, alone or in combination with one or more of the first through tenth aspects, process 1300 includes transmitting a dynamic grant in an SPS occasion for transmitting a retransmission in a future SPS occasion.

In a twelfth aspect, alone or in combination with one or more of the first through eleventh aspects, process 1300 includes automatically transmitting a retransmission in a future SPS occasion or on one or more resources other than SPS occasions.

In a thirteenth aspect, alone or in combination with one or more of the first through twelfth aspects, communicating with the UE during the SCG dormant state using the one or more of CG or SPS includes transmitting tracking information to the UE on a PDSCH using SPS transmissions.

In a fourteenth aspect, alone or in combination with one or more of the first through thirteenth aspects, process 1300 includes transmitting tracking information that includes one or more of a transmit power adjustment command, an uplink beam direction, spatial relationship information, a downlink beam direction, a TCI state, or a timing adjustment command on a PDSCH.

In a fifteenth aspect, alone or in combination with one or more of the first through fourteenth aspects, transmitting the tracking information includes transmitting the tracking information in a MAC CE on the PDSCH.

In a sixteenth aspect, alone or in combination with one or more of the first through fifteenth aspects, process 1300 includes transmitting a measurement trigger on a PDSCH.

In a seventeenth aspect, alone or in combination with one or more of the first through sixteenth aspects, process 1300 includes transmitting a reconfiguration for one or more of the CG or the SPS.

In an eighteenth aspect, alone or in combination with one or more of the first through seventeenth aspects, communicating with the UE during the SCG dormant state using the one or more of CG or SPS includes transmitting one or more of tracking information, measurement information, or measurement configuration information to the UE on a PDSCH using SPS transmissions, and receiving one or more of measurement information or an SRS from the UE on a PUSCH using CG occasions, and SPS occasions are separated from CG occasions by an offset that satisfies an offset threshold.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
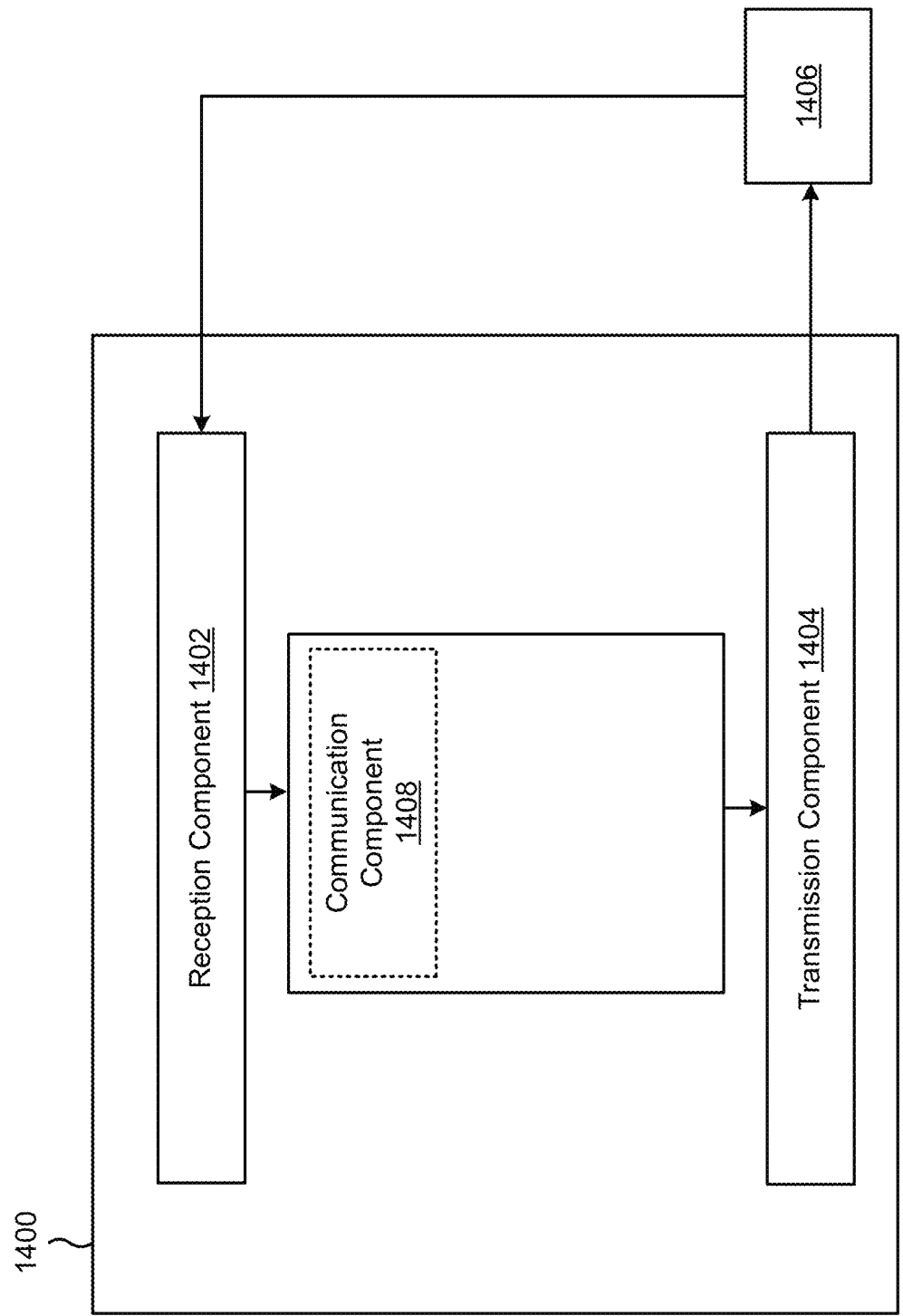
FIG. 14 is a block diagram of an example apparatus for wireless communication, in accordance with the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a communication component 1408, among other examples.

In some aspects, the apparatus 1400 may be configured to perform one or more operations described herein in connection with FIGS. 6-13. Additionally, or alternatively, the apparatus 1400 may be configured to perform one or more processes described herein, such as process 1100 of FIG. 11, or a combination thereof. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be collocated with the reception component 1402 in a transceiver.

The reception component 1402 may receive an indication that an SCG is to enter an SCG dormant state and an indication for using one or more of CG or SPS for communication with an SN of the SCG during the SCG dormant state. The communication component 1408 may communicate with the SN of the SCG during the SCG dormant state using the one or more of CG or SPS. In some aspects, the communication component 1408 may include one or more antennas, a demodulator, a MIMO detector, a receive processor, a modulator, a transmit MIMO processor, a transmit processor, a controller/processor, a memory, or a combination thereof, of the UE described above in connection with FIG. 2. In some aspects, the communication component 1408 may employ the reception component 1402 and the transmission component 1404.

The transmission component 1404 may transmit an ACK on a PUSCH for a downlink communication. The transmission component 1404 may transmit a NACK on a PUSCH for a downlink communication.

The transmission component 1404 may transmit a retransmission of the uplink communication between CG occasions based at least in part on a received dynamic grant. The transmission component 1404 may transmit a retransmission of the uplink communication in a future CG occasion based at least in part on a received dynamic grant. The transmission component 1404 may automatically transmit a retransmission of the uplink communication in a future CG occasion. The transmission component 1404 may transmit a retransmission of the uplink communication in a same CG occasion using a CG repetition of the uplink communication. The transmission component 1404 may transmit an ACK on a PUSCH for a received downlink communication. The transmission component 1404 may transmit a NACK on a PUSCH for a downlink communication.

The reception component 1402 may receive a dynamic grant in an SPS occasion for receiving a retransmission on resources other than SPS occasions. The reception component 1402 may receive a dynamic grant in an SPS occasion for receiving a retransmission in a future SPS occasion. The reception component 1402 may automatically receive an SPS retransmission in a future SPS occasion or on one or more resources other than SPS occasions.

The communication component 1408 may align a downlink monitoring window based at least in part on being configured to use SPS transmissions. In some aspects, the communication component 1408 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The reception component 1402 may receive tracking information that includes one or more of a transmit power adjustment command, an uplink beam direction, spatial relationship information, a downlink beam direction, a TCI state, or a timing adjustment command from the SN on a physical downlink shared channel. The reception component 1402 may receive a measurement trigger on a physical downlink shared channel. The reception component 1402 may receive a reconfiguration for one or more of the CG or the SPS.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
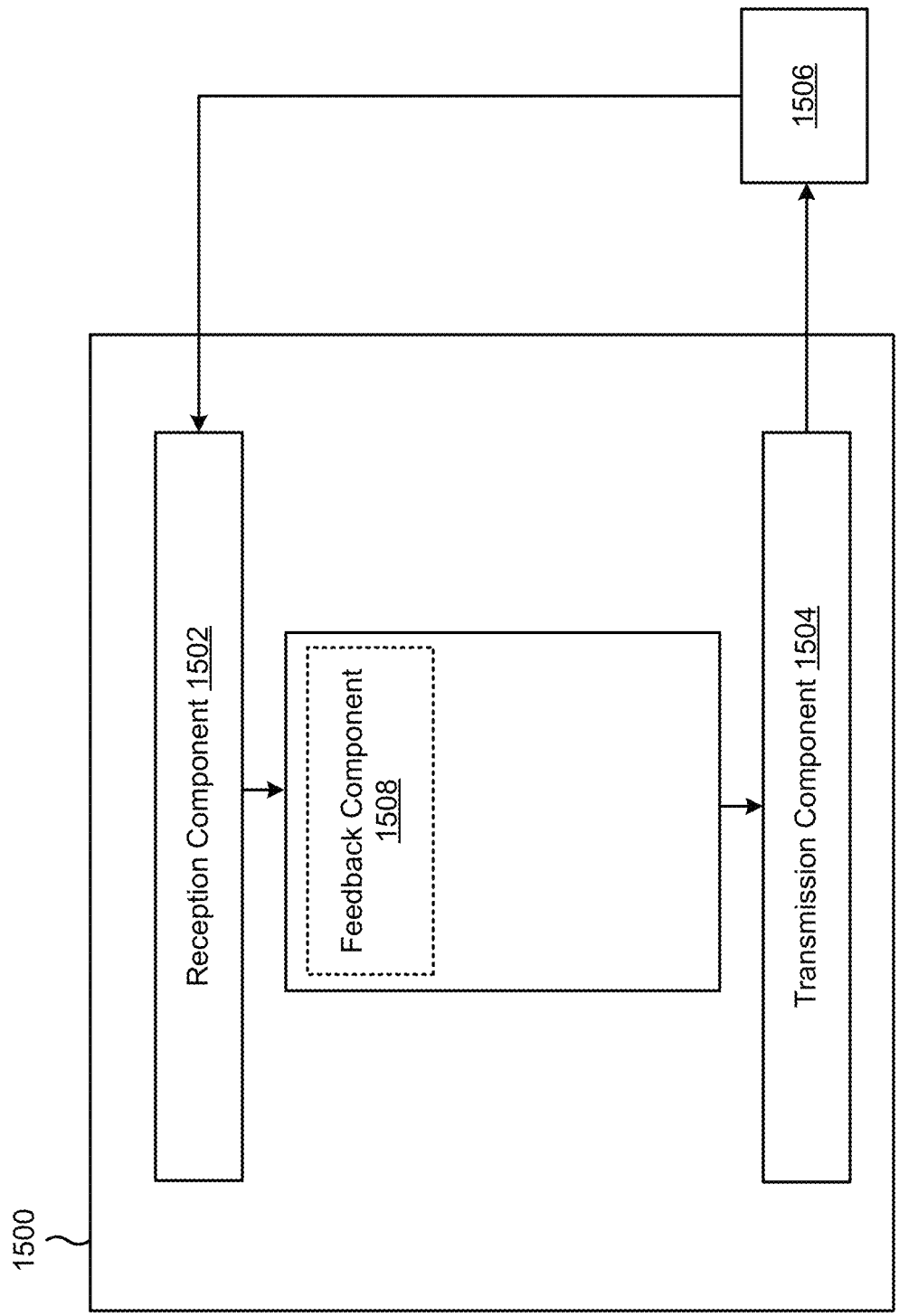
FIG. 15 is a block diagram of an example apparatus for wireless communication, in accordance with the present disclosure.

FIG. 15 is a block diagram of an example apparatus 1500 for wireless communication. The apparatus 1500 may be a base station of an MCG (e.g., MN), or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include one or more of a feedback component 1508, among other examples.

In some aspects, the apparatus 1500 may be configured to perform one or more operations described herein in connection with FIGS. 6-13. Additionally, or alternatively, the apparatus 1500 may be configured to perform one or more processes described herein, such as process 1200 of FIG. 12, or a combination thereof. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be collocated with the reception component 1502 in a transceiver.

The transmission component 1504 may transmit an indication to an SN in an SCG that the SCG is to enter an SCG dormant state and an indication to use one or more of CG or SPS for communication in the SCG during the SCG dormant state. The transmission component 1504 may transmit, to a UE, the indication to enter the SCG dormant state and the indication to use one or more of CG or SPS for communication in the SCG during the SCG dormant state based at least in part on receiving an acknowledgement of the indication to enter the SCG dormant state from the SN of the SCG. The transmission component 1504 may employ the feedback component 1508 to determine if an acknowledgement was received. The feedback component 1508 may include a controller/processor, a memory, or a combination thereof, of the base station described above in connection with FIG. 2

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
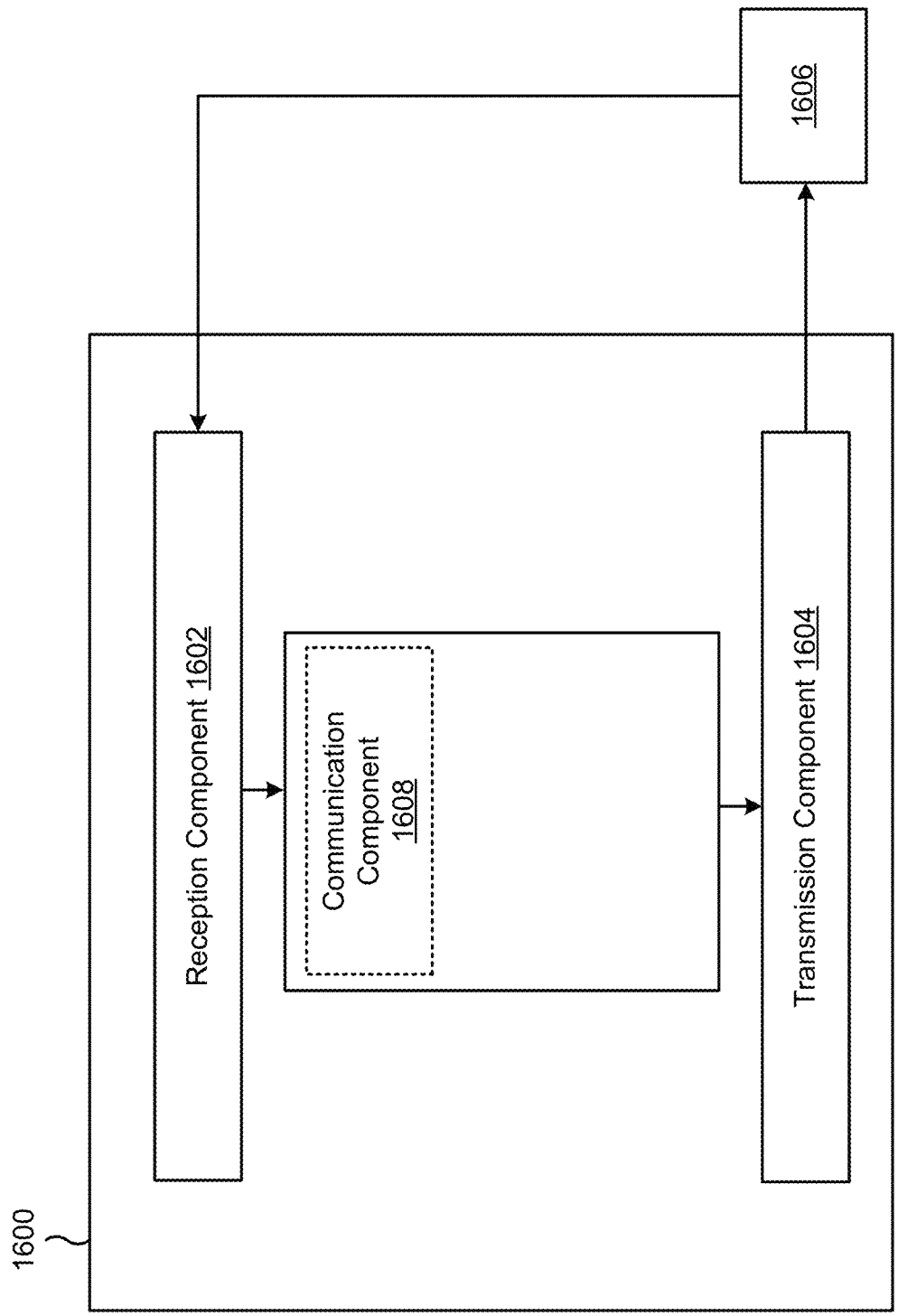
FIG. 16 is a block diagram of an example apparatus for wireless communication, in accordance with the present disclosure.

FIG. 16 is a block diagram of an example apparatus 1600 for wireless communication. The apparatus 1600 may be a base station of an SCG (e.g., SN), or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include one or more of a communication component 1608, among other examples.

In some aspects, the apparatus 1600 may be configured to perform one or more operations described herein in connection with FIGS. 6-13. Additionally, or alternatively, the apparatus 1600 may be configured to perform one or more processes described herein, such as process 1300 of FIG. 13, or a combination thereof. In some aspects, the apparatus 1600 and/or one or more components shown in FIG. 16 may include one or more components of the base station described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the base station described above in connection with FIG. 2. In some aspects, the transmission component 1604 may be collocated with the reception component 1602 in a transceiver.

The reception component 1602 may receive an indication that the SCG is to enter an SCG dormant state and an indication for using one or more of CG or SPS for communication with a UE during the SCG dormant state. The communication component 1608 may communicate with the UE during the SCG dormant state using the one or more of CG or SPS. In some aspects, the communication component 1608 may include one or more antennas, a demodulator, a MIMO detector, a receive processor, a modulator, a transmit MIMO processor, a transmit processor, a controller/processor, a memory, or a combination thereof, of the base station described above in connection with FIG. 2. In some aspects, the communication component 1608 may employ the reception component 1602 and the transmission component 1604.

The transmission component 1604 may transmit an ACK on a PDSCH for an uplink communication. The transmission component 1604 may transmit a NACK on a PDSCH for an uplink communication.

The reception component 1602 may receive a retransmission of the uplink communication between CG occasions based at least in part on transmitting a dynamic grant. The reception component 1602 may receive a retransmission of the uplink communication in a future CG occasion based at least in part on transmitting a dynamic grant. The reception component 1602 may receive a retransmission of the uplink communication in a same CG occasion of a CG repetition of the uplink communication. The reception component 1602 may receive an ACK on a PUSCH for a received downlink communication. The reception component 1602 may receive a NACK on a PUSCH for a downlink communication.

The transmission component 1604 may transmit a dynamic grant in an SPS occasion for transmitting a retransmission on resources other than SPS occasions. The transmission component 1604 may transmit a dynamic grant in an SPS occasion for transmitting a retransmission in a future SPS occasion. The transmission component 1604 may automatically transmit a retransmission in a future SPS occasion or on one or more resources other than SPS occasions. The transmission component 1604 may transmit tracking information that includes one or more of a transmit power adjustment command, an uplink beam direction, spatial relationship information, a downlink beam direction, TCI state, or a timing adjustment command on a physical downlink shared channel. The transmission component 1604 may transmit a measurement trigger on a PDSCH. The transmission component 1604 may transmit a reconfiguration for one or more of the CG or the SPS.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: receiving an indication that a secondary cell group (SCG) is to enter an SCG dormant state and an indication for using one or more of configured grant (CG) on an uplink or semi-persistent scheduling (SPS) on a downlink for communication with a secondary node (SN) of the SCG during the SCG dormant state; and communicating with the SN of the SCG during the SCG dormant state using the one or more of CG or SPS.

Aspect 2: The method of Aspect 1, wherein communicating with the SN of the SCG during the SCG dormant state using the CG includes transmitting one or more of measurement reports, or a sounding reference signal (SRS) to the SN of the SCG in a physical uplink shared channel using CG occasions.

Aspect 3: The method of Aspect 2, further comprising transmitting an acknowledgment on a physical uplink shared channel for a downlink communication.

Aspect 4: The method of Aspect 2, further comprising transmitting a negative acknowledgment on a physical uplink shared channel for a downlink communication.

Aspect 5: The method of Aspect 4, further comprising transmitting a retransmission of the uplink communication between CG occasions based at least in part on a received dynamic grant.

Aspect 6: The method of Aspect 4, further comprising transmitting a retransmission of the uplink communication in a future CG occasion based at least in part on a received dynamic grant.

Aspect 7: The method of Aspect 4, further comprising automatically transmitting a retransmission of the uplink communication in a future CG occasion.

Aspect 8: The method of Aspect 4, further comprising transmitting a retransmission of the uplink communication in a same CG occasion using a CG repetition of the uplink communication.

Aspect 9: The method of any of Aspects 1-8, wherein communicating with the SN of the SCG during the SCG dormant state using the SPS includes receiving one or more of tracking information, measurement information, or measurement configuration information from the SN of the SCG on a physical downlink shared channel using SPS transmissions.

Aspect 10: The method of Aspect 9, further comprising transmitting an acknowledgment on a physical uplink shared channel for a received downlink communication.

Aspect 11: The method of Aspect 9, further comprising transmitting a negative acknowledgment on a physical uplink shared channel for a downlink communication.

Aspect 12: The method of Aspect 11, further comprising receiving a dynamic grant in an SPS occasion for receiving a retransmission on resources other than SPS occasions.

Aspect 13: The method of Aspect 12, wherein receiving the dynamic grant includes receiving the dynamic grant via a medium access control control element, downlink control information, or a radio resource control message.

Aspect 14: The method of Aspect 11, further comprising receiving a dynamic grant in an SPS occasion for receiving a retransmission in a future SPS occasion.

Aspect 15: The method of Aspect 11, further comprising automatically receiving an SPS retransmission in a future SPS occasion or on one or more resources other than SPS occasions.

Aspect 16: The method of any of Aspects 1-15, wherein communicating with the SN of the SCG during the SCG dormant state using the SPS includes receiving tracking information from the SN of the SCG on a physical downlink shared channel using SPS transmissions.

Aspect 17: The method of any of Aspects 1-16, further comprising aligning a downlink monitoring window based at least in part on being configured to use SPS transmissions.

Aspect 18: The method of Aspect 17, further comprising receiving tracking information that includes one or more of a transmit power adjustment command, an uplink beam direction, spatial relationship information, a downlink beam direction, a transmission configuration indicator state, or a timing adjustment command from the SN on a physical downlink shared channel (PDSCH).

Aspect 19: The method of Aspect 18, wherein receiving the tracking information includes receiving the tracking information in a medium access control control element on the PDSCH.

Aspect 20: The method of any of Aspects 1-19, further comprising receiving a measurement trigger on a physical downlink shared channel.

Aspect 21: The method of any of Aspects 1-20, further comprising receiving a reconfiguration for one or more of the CG or the SPS.

Aspect 22: The method of any of Aspects 1-21, wherein communicating with the SN of the SCG during the SCG dormant state using the CG or SPS includes receiving one or more of tracking information, measurement information, or measurement configuration information from the SN of the SCG on a physical downlink shared channel using SPS transmissions, and transmitting one or more of measurement information or a sounding reference signal to the SN of the SCG on a physical uplink shared channel using CG occasions, and wherein SPS occasions are separated from CG occasions by an offset that satisfies an offset threshold.

Aspect 23: A method of wireless communication performed by a base station of a master cell group, comprising: transmitting an indication to a secondary node (SN) in a secondary cell group (SCG) that the SCG is to enter an SCG dormant state and an indication to use one or more of configured grant (CG) or semi-persistent scheduling (SPS) for communication in the SCG during the SCG dormant state; and transmitting, to a user equipment, the indication to enter the SCG dormant state and the indication to use one or more of CG or SPS for communication in the SCG during the SCG dormant state based at least in part on receiving an acknowledgement of the indication to enter the SCG dormant state from the SN of the SCG.

Aspect 24: A method of wireless communication performed by a base station of a secondary cell group (SCG), comprising: receiving an indication that the SCG is to enter an SCG dormant state and an indication for using one or more of configured grant (CG) or semi-persistent scheduling (SPS) for communication with a user equipment (UE) during the SCG dormant state; and communicating with the UE during the SCG dormant state using the one or more of CG or SPS.

Aspect 25: The method of Aspect 24, wherein communicating with the UE during the SCG dormant state using the one or more of CG or SPS includes receiving one or more of measurement information or a sounding reference signal from the UE on a physical uplink shared channel using CG occasions.

Aspect 26: The method of Aspect 25, further comprising transmitting an acknowledgment on a physical downlink shared channel for an uplink communication.

Aspect 27: The method of Aspect 25, further comprising transmitting a negative acknowledgment on a physical downlink shared channel for an uplink communication.

Aspect 28: The method of Aspect 27, further comprising receiving a retransmission of the uplink communication between CG occasions based at least in part on transmitting a dynamic grant.

Aspect 29: The method of Aspect 27, further comprising receiving a retransmission of the uplink communication in a future CG occasion based at least in part on transmitting a dynamic grant.

Aspect 30: The method of Aspect 27, further comprising receiving a retransmission of the uplink communication in a same CG occasion of a CG repetition of the uplink communication.

Aspect 31: The method of any of Aspects 24-30, wherein communicating with the UE during the SCG dormant state using the one or more of CG or SPS includes transmitting one or more of tracking information, measurement information, or measurement configuration information to the UE on a physical downlink shared channel using SPS transmissions.

Aspect 32: The method of Aspect 31, further comprising receiving an acknowledgment on a physical uplink shared channel for a received downlink communication.

Aspect 33: The method of Aspect 31, further comprising receiving a negative acknowledgment on a physical uplink shared channel for a downlink communication.

Aspect 34: The method of Aspect 33, further comprising transmitting a dynamic grant in an SPS occasion for transmitting a retransmission on resources other than SPS occasions.

Aspect 35: The method of Aspect 33, further comprising transmitting a dynamic grant in an SPS occasion for transmitting a retransmission in a future SPS occasion.

Aspect 36: The method of Aspect 33, further comprising automatically transmitting a retransmission in a future SPS occasion or on one or more resources other than SPS occasions.

Aspect 37: The method of any of Aspects 24-36, wherein communicating with the UE during the SCG dormant state using the one or more of CG or SPS includes transmitting tracking information to the UE on a physical downlink shared channel using SPS transmissions.

Aspect 38: The method of any of Aspects 24-37, further comprising transmitting tracking information that includes one or more of a transmit power adjustment command, an uplink beam direction, spatial relationship information, a downlink beam direction, a transmission configuration indicator state, or a timing adjustment command on a physical downlink shared channel (PDSCH).

Aspect 39: The method of Aspect 38, wherein transmitting the tracking information includes transmitting the tracking information in a medium access control control element on the PDSCH.

Aspect 40: The method of any of Aspects 24-39, further comprising transmitting a measurement trigger on a physical downlink shared channel.

Aspect 41: The method of any of Aspects 24-40, further comprising transmitting a reconfiguration for one or more of the CG or the SPS.

Aspect 42: The method of any of Aspects 24-41, wherein communicating with the UE during the SCG dormant state using the one or more of CG or SPS includes transmitting one or more of tracking information, measurement information, or measurement configuration information to the UE on a physical downlink shared channel using SPS transmissions, and receiving one or more of measurement information or a sounding reference signal from the UE on a physical uplink shared channel using CG occasions, and wherein SPS occasions are separated from CG occasions by an offset that satisfies an offset threshold.

Aspect 43: An apparatus for wireless communication at a device, comprising a processor; memory coupled with the processor; and instructions stored in the memory and executable by the processor to cause the apparatus to perform the method of one or more of Aspects 1-42.

Aspect 44: A device for wireless communication, comprising a memory and one or more processors coupled to the memory, the one or more processors configured to perform the method of one or more of Aspects 1-42.

Aspect 45: An apparatus for wireless communication, comprising at least one means for performing the method of one or more of Aspects 1-42.

Aspect 46: A non-transitory computer-readable medium storing code for wireless communication, the code comprising instructions executable by a processor to perform the method of one or more of Aspects 1-42.

Aspect 47: A non-transitory computer-readable medium storing a set of instructions for wireless communication, the set of instructions comprising one or more instructions that, when executed by one or more processors of a device, cause the device to perform the method of one or more of Aspects 1-42.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors, coupled to the memory, configured to:
      receive an indication that a secondary cell group (SCG) is to enter an SCG dormant state and an indication for using one or more of configured grant (CG) on an uplink or semi-persistent scheduling (SPS) on a downlink for communication with a secondary node (SN) of the SCG during the SCG dormant state; and
      communicate with the SN via the SCG during the SCG dormant state, wherein the one or more processors, to communicate with the SN via the SCG during the SCG dormant state, are configured to:
         receive one or more of tracking information, measurement information, or measurement configuration information from the SN of the SCG on a physical downlink shared channel using SPS transmissions, and
         transmit one or more of measurement information or a sounding reference signal to the SN via the SCG on a physical uplink shared channel using CG occasions.

2. The UE of claim 1, wherein the one or more processors are configured to transmit an acknowledgment or a negative acknowledgement on an uplink shared channel for a downlink communication.

3. The UE of claim 1, wherein the one or more processors are configured to transmit a retransmission of an uplink communication between CG occasions or in a future CG based at least in part on a received dynamic grant.

4. The UE of claim 1, wherein the one or more processors are configured to automatically transmit a retransmission of an uplink communication in a future CG occasion.

5. The UE of claim 1, wherein the one or more processors are configured to transmit a retransmission of an uplink communication in a same CG occasion using a CG repetition of the uplink communication.

6. The UE of claim 1, wherein the one or more processors are configured to transmit an acknowledgment or a negative acknowledgement on an uplink shared channel for a received downlink communication.

7. The UE of claim 1, wherein the one or more processors are configured to receive a dynamic grant, via a medium access control control element (MAC CE) or a radio resource control message, in an SPS occasion for receiving a retransmission on resources other than SPS occasions.

8. The UE of claim 1, wherein the one or more processors are configured to receive a dynamic grant in an SPS occasion for receiving a retransmission in a future SPS occasion or automatically receive an SPS retransmission in the future SPS occasion or on one or more resources other than SPS occasions.

9. The UE of claim 1, wherein the one or more processors are configured to align a downlink monitoring window based at least in part on being configured to use SPS transmissions.

10. The UE of claim 1, wherein the one or more processors are configured to receive the tracking information, in a medium access control control element (MAC CE) on a physical downlink shared channel (PDSCH), the tracking information including one or more of a transmit power adjustment command, an uplink beam direction, spatial relationship information, a downlink beam direction, a transmission configuration indicator state, or a timing adjustment command from the SN on the PDSCH.

11. The UE of claim 1, wherein the one or more processors are configured to receive a measurement trigger on a physical downlink shared channel or a reconfiguration for one or more of the CG or the SPS.

12. The UE of claim 1, wherein SPS occasions are separated from CG occasions by an offset that satisfies an offset threshold.

13. The UE of claim 1, wherein the one or more processors are configured to perform an admission control procedure for CG transmissions by selecting one or more resources from a resource pool based on a threshold.

14. A network entity of a master cell group (MCG) for wireless communication, comprising:
memory; and
one or more processors, coupled to the memory, configured to:
transmit an indication to a secondary node (SN) in a secondary cell group (SCG) that the SCG is to enter an SCG dormant state;
receive, from the SN, an acknowledgement of the indication to enter the SCG dormant state;
transmit, to a user equipment, an indication to use one or more of configured grant (CG) or semi-persistent scheduling (SPS) for communication via the SCG during the SCG dormant state based at least in part on receiving the acknowledgement, wherein the indication is transmitted in coordination with an indication of a CG or SPS configuration; and
transmit, to the SN, the indication of the CG or SPS configuration.

15. The network entity of claim 14, wherein the one or more processors are further configured to determine that the SCG is to enter the SCG dormant state.

16. The network entity of claim 14, wherein the one or more processors are further configured to transmit an indication to enter the SCG dormant state to the user equipment.

17. A network entity of a secondary cell group (SCG) for wireless communication, comprising:
memory; and
one or more processors, coupled to the memory, configured to:
receive an indication that the SCG is to enter an SCG dormant state and an indication for using one or more of configured grant (CG) or semi-persistent scheduling (SPS) for communication with a user equipment (UE) during the SCG dormant state; and
communicate with the UE via the SCG during the SCG dormant state, wherein the one or more processors, to communicate with the UE via the SCG during the SCG dormant state, are configured to:
transmit one or more of tracking information, measurement information, or measurement configuration information to the UE on a physical downlink shared channel using SPS transmissions, and
receive one or more of measurement information or a sounding reference signal from the UE via the SCG on a physical uplink shared channel using CG occasions.

18. The network entity of claim 17, wherein the one or more processors are configured to transmit an acknowledgment or a negative acknowledgement on a downlink shared channel for an uplink communication.

19. The network entity of claim 17, wherein the one or more processors are configured to receive a retransmission of the uplink communication between CG occasions or in a future CG occasion based at least in part on transmitting a dynamic grant.

20. The network entity of claim 17, wherein the one or more processors are configured to receive a retransmission of the uplink communication in a same CG occasion of a CG repetition of the uplink communication.

21. The network entity of claim 17, wherein the one or more processors are configured to receive an acknowledgment or a negative acknowledgement on an uplink shared channel for a received downlink communication.

22. The network entity of claim 17, wherein the one or more processors are configured to transmit a dynamic grant in an SPS occasion for transmitting a retransmission on resources other than SPS occasions.

23. The network entity of claim 17, wherein the one or more processors are configured to transmit a dynamic grant in an SPS occasion for transmitting a retransmission in a future SPS occasion.

24. The network entity of claim 17, wherein the one or more processors are configured to automatically transmit a retransmission in a future SPS occasion or on one or more resources other than SPS occasions.

25. The network entity of claim 17, wherein the one or more processors, to communicate with the UE via the SCG during the SCG dormant state using the one or more of CG or SPS, are configured to transmit the tracking information to the UE on a physical downlink shared channel using SPS transmissions.

26. The network entity of claim 17, wherein the one or more processors are configured to transmit, in a medium access control control element (MAC CE) on a physical downlink shared channel (PDSCH), the tracking information, the tracking information including one or more of a transmit power adjustment command, an uplink beam direction, spatial relationship information, a downlink beam direction, a transmission configuration indicator state, or a timing adjustment command on the PDSCH.

27. The network entity of claim 17, wherein the one or more processors are configured to transmit a measurement trigger on a physical downlink shared channel or a reconfiguration for one or more of the CG or the SPS.

28. The network entity of claim 17, wherein SPS occasions are separated from CG occasions by an offset that satisfies an offset threshold.

29. The network entity of claim 17, wherein a downlink monitoring window is aligned with each of the SPS transmissions.

30. The network entity of claim 17, wherein the tracking information includes beam updates as transmission configuration indicator (TCI) states.

* * * * *